United States Patent
Siegel et al.

(10) Patent No.: US 7,802,200 B1
(45) Date of Patent: Sep. 21, 2010

(54) DETECTING INCONSISTENCIES AND INCOMPATIBILITIES OF SELECTED ITEMS

(75) Inventors: Hilliard B Siegel, Seattle, WA (US); Jeffrey P Bezos, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 352 days.

(21) Appl. No.: 11/391,813

(22) Filed: Mar. 29, 2006

(51) Int. Cl.
*G06F 3/048* (2006.01)
*G06F 17/30* (2006.01)
*G06F 7/00* (2006.01)

(52) U.S. Cl. .......................... 715/811; 705/26; 705/27

(58) Field of Classification Search ............. 705/26–27; 715/811
See application file for complete search history.

(56) References Cited

U.S. PATENT DOCUMENTS

| | | | | |
|---|---|---|---|---|
| 6,167,383 A * | 12/2000 | Henson | .................. | 705/26 |
| 6,646,659 B1 * | 11/2003 | Brown et al. | ................. | 715/811 |
| 6,859,215 B1 * | 2/2005 | Brown et al. | ................. | 715/811 |
| 7,003,526 B1 * | 2/2006 | Lee et al. | .................... | 707/102 |
| 7,050,988 B2 * | 5/2006 | Atcheson et al. | ............. | 705/10 |
| 7,076,454 B2 * | 7/2006 | Kim | ........................... | 705/26 |
| 7,178,108 B1 * | 2/2007 | Workman et al. | ............ | 715/762 |
| 7,188,333 B1 * | 3/2007 | LaMotta et al. | ............. | 717/106 |
| 7,233,917 B2 * | 6/2007 | Bugarin et al. | ................. | 705/27 |
| 7,272,577 B1 * | 9/2007 | LaMotta et al. | ............... | 705/31 |
| 7,318,043 B1 * | 1/2008 | Silver et al. | .................... | 705/26 |
| 2002/0026373 A1 * | 2/2002 | Kamath et al. | ................. | 705/26 |
| 2002/0065736 A1 * | 5/2002 | Willner et al. | ................. | 705/26 |
| 2002/0072979 A1 * | 6/2002 | Sinha et al. | .................... | 705/26 |
| 2002/0091579 A1 * | 7/2002 | Yehia et al. | .................... | 705/26 |
| 2002/0161668 A1 * | 10/2002 | Lutz et al. | ....................... | 705/26 |
| 2002/0174031 A1 * | 11/2002 | Weiss | .......................... | 705/26 |
| 2003/0004798 A1 * | 1/2003 | McAuliffe et al. | ............ | 705/14 |
| 2003/0095141 A1 * | 5/2003 | Shah et al. | ................... | 345/735 |
| 2003/0204519 A1 * | 10/2003 | Sirivara et al. | .............. | 707/101 |
| 2004/0006494 A1 * | 1/2004 | Badinelli | ........................ | 705/2 |
| 2004/0034568 A1 * | 2/2004 | Sone | ........................... | 705/26 |
| 2004/0054625 A1 * | 3/2004 | Kellogg et al. | ................ | 705/41 |
| 2004/0103043 A1 * | 5/2004 | Reade et al. | ................... | 705/27 |
| 2004/0128203 A1 * | 7/2004 | Pierre et al. | .................... | 705/26 |
| 2004/0148226 A1 * | 7/2004 | Shanahan | ..................... | 705/26 |
| 2004/0230495 A1 * | 11/2004 | Lotvin et al. | ................... | 705/26 |
| 2005/0021413 A1 * | 1/2005 | Berry et al. | ................... | 705/26 |

(Continued)

OTHER PUBLICATIONS

Rohn, Janice Ann, Creating Usable E-Commerce Sites, Standard View, vol. 6 , Issue 3 (Sep. 1998).*

(Continued)

*Primary Examiner*—William L Bashore
*Assistant Examiner*—Ashraf Zahr
(74) *Attorney, Agent, or Firm*—Christensen O'Connor Johnson Kindness PLLC

(57) ABSTRACT

A computer system and method for detecting conditions resulting in an inconsistency and/or an increased likelihood of a return is presented. The computer system comprises an evaluation component and a notification component. The evaluation component is configured to evaluate an item selected for purchase by a consumer to determine whether the consumer's purchase of the selected item represents an inconsistency and/or an increased likelihood of user dissatisfaction. The notification component is configured to notify the consumer if and when the consumer's selection of an item represents an inconsistency and/or an increased likelihood of user dissatisfaction.

109 Claims, 15 Drawing Sheets

U.S. PATENT DOCUMENTS

| | | | |
|---|---|---|---|
| 2005/0033665 A1* | 2/2005 | Kumhyr | 705/28 |
| 2005/0033683 A1* | 2/2005 | Sacco et al. | 705/37 |
| 2005/0080648 A1* | 4/2005 | Huelsman et al. | 705/1 |
| 2005/0086128 A1* | 4/2005 | Shanahan | 705/26 |
| 2005/0114881 A1* | 5/2005 | Philyaw et al. | 725/25 |
| 2005/0283791 A1* | 12/2005 | McCarthy et al. | 725/1 |
| 2006/0015411 A1* | 1/2006 | Mela | 705/26 |
| 2006/0031768 A1* | 2/2006 | Shah et al. | 715/735 |
| 2007/0179807 A1* | 8/2007 | Nessinger et al. | 705/2 |

OTHER PUBLICATIONS

Sineenard Pinyapong and Toshikazu Kato, A Framework of Time, Place, Purpose and Personal Profile Based Recommendation Service for Mobile Environment, IEICE Trans. Inf. & Syst., vol. E88—D, No. 5 May 2005.*

Datta, A., et al., "Real-Time Interaction Management," published in DM Direct in Mar. 2000, <http://www.dmreview.com/editorial/dmreview/print_action.cfm?articleId=2034> [retrieved Dec. 1, 2005].

* cited by examiner

DETECTING INCONSISTENCIES AND INCOMPATIBILITIES OF SELECTED ITEMS

BACKGROUND

As most people readily recognize, with the increased popularity of the Internet, network shopping services, e.g., Web sites that enable users to make purchases online, have become increasingly accepted and popular. The advantages of purchasing from/through network shopping services are numerous. For example, network shopping services offer a wide selection of products to choose from, price comparisons for the cost conscious, and the convenience of shopping for an item from anywhere a consumer may have access to a shopping service, rather than making a trip to a particular store. However, there may be inconveniences associated with purchasing goods and services (i.e., "items") from network shopping services. For example, returning an item for an exchange or refund may be perceived as an inconvenience to the consumer, particularly if the item purchased must be repackaged and shipped to be returned. Vendors, like consumers, may also perceive returns as an inconvenience. Processing a return may represent an unreimbursed cost to a vendor. At a minimum, there is a processing and restocking cost associated with each return. Moreover, in some instances, a returned item is no longer saleable, or if saleable, only at a reduced price, which represents an additional loss to a vendor.

Returns are made for a variety of circumstances and/or conditions. These circumstances and conditions include consumer "errors," such as the purchase of the wrong item, size, or format, incompatibility with current systems, and the like. For example, if a consumer who prefers and consistently purchases wide-screen editions of movies inadvertently purchases a full-screen edition of a movie (especially when a wide-screen edition of the movie is available), the likelihood of its return is greatly increased, as well as the perceived inconvenience to the consumer. Conversely, returns also arise from vendor-related issues, such as sending the wrong or a defective item. Of course, returns also occur even when neither the consumer nor the vendor made an error, such as when the consumer is dissatisfied with the item, experiences buyer's remorse, a change of heart or mind, or finds the same product for less from another vendor.

While both consumers and vendors currently recognize and accept the perceived inconveniences that returned items represent, both would be greatly benefited if the frequency with which returns occur could be reduced. Similarly, a consumer's purchase experience would be improved by identifying items that are most compatible and consistent for the consumer. Thus, one way to reduce the frequency of returns and enhance a consumer's purchase experience is to detect circumstances in which a return is likely to occur while the consumer is shopping and, if such circumstances are detected, to advise the consumer of the circumstance and validate that the purchase is, indeed, what the consumer desires.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the present invention, a computer system for evaluating items selected by a user is presented. The computer system comprises one or more databases for storing information related to the user and information related to items available for selection by the user, and a computing device in communication with the one or more databases. The computing device is configured to determine whether an item selected by the user is inconsistent with information stored in the one or more databases. If the selected item is inconsistent with information stored in the one or more databases, the computing device advises the user of the inconsistency. Additionally, the computing device confirms the user's intent to select the item if the selected item is inconsistent with information stored in the one or more databases.

In another aspect of the invention, the computing device may determine whether the item selected by the user is inconsistent with user profile information, such as a history of items previously selected by the user, preferences of the user, a user's wish list, a user's digital locker, etc. For example, the computing device may determine that a selected item is inconsistent with the user profile information by comparing aspects of the selected item to aspects of items previously selected by the user or by comparing aspects of the selected item to the preferences of the user. Such aspects may include category (e.g., books, electronics, software, etc.), inter-operability (e.g., operating system with computer platform), type (e.g., design, size, color, duration), or trait (e.g., different types of flash memory).

In accordance with another aspect of the invention, the computing device may determine whether the item selected by the user is inconsistent with any items in a set of other items presently selected by the user (e.g., in an electronic shopping cart). For example, the computing device may determine that the item selected by the user is inconsistent with the set of items by comparing aspects of the selected item to aspects of the other items in the set of items presently selected by the user. Again, such aspects may include interoperability, type or trait.

In accordance with yet another aspect of the invention, the computing device may determine whether a combination of items presently selected by the user is inconsistent with one or more combinations of the same items selected by other users. For example, if the combination of items presently selected by the user corresponds to one or more combinations of items that were selected by other users, but were dissatisfied with them, an inconsistency may be determined.

If the computing device determines that an inconsistency exists using any of the techniques described above, the computing device may also present an alternative item to the user as a substitute for the selected item, if a suitable, consistent alternative for the selected item exists.

Finally, according to other aspects of the invention, a computer-accessible medium, a computer-implemented method, and a computer warning system for detecting and/or warning of inconsistencies associated with a selected item are also provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
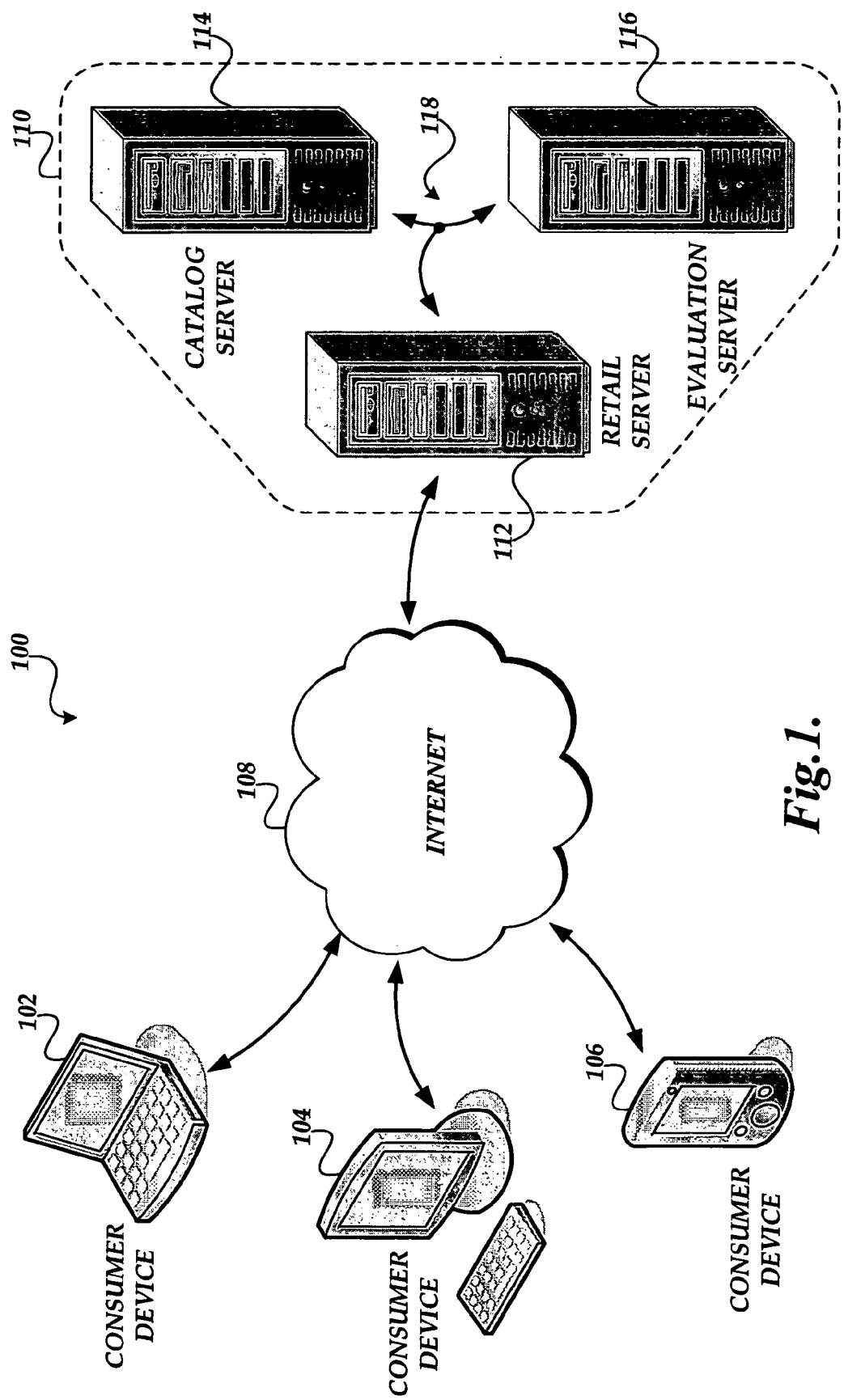
FIG. 1 is a pictorial diagram illustrating an exemplary networked environment suitable for conducting purchase transactions with a consumer.

As will be described in greater detail below, in conducting a purchase transaction by a consumer via a network shopping service, a consumer's selected items are evaluated to detect for known or perceived inconsistencies and/or incompatibilities with information available to a vendor and/or the network shopping service. If a known or perceived inconsistency or incompatibility exists, the consumer may be proactively warned of the condition. Appreciating that the detected inconsistency/incompatibility may be intentional, the consumer may be given the opportunity to continue with the transaction or take corrective actions. When and where it can be determined, the advisory warning may also include or facilitate the selection of one or more compatible, substitute items. Detecting inconsistencies and/or incompatibilities benefits both the vendor and consumer. The vendor is benefited in that the incidents of returns are reduced. The consumer is benefited in that what the consumer purchases was truly intended.

With regard to the term "vendor," it should be appreciated that a vendor may be a merchant, distributor, retailer, individual, or any other entity or person that offers goods and/or services. A vendor may correspond to a traditional "bricks and mortar" vendor or, alternatively, to a vendor having a networked shopping service with whom a consumer may conduct a purchase transaction. Moreover, a vendor may also correspond to an electronic marketplace, e.g., a network shopping service through which numerous sellers offer their goods and services but which appears to the consumer as a single purchasing site.

In one embodiment of the present invention, selected items are compared to consumer profile information, such as the consumer's prior purchases, to determine if an inconsistency or incompatibility exists. More specifically, aspects of the selected items are compared to corresponding aspects of the consumer's prior purchases. If the comparison of these aspects indicates that there is an inconsistency or incompatibility, the consumer is notified and is requested to provide confirmation regarding his or her purchase. In addition to or instead of prior purchases, the vendor may compare aspects of the selected items to other consumer profile information, such as consumer-supplied personal preferences, wish lists, the consumer's digital locker, etc. A digital locker refers to storage and maintenance of digital items, such as music, digital books, movies, software, and the like, that have been purchased by the consumer. In other words, these items have been purchased by the consumer and are stored by the vendor in the consumer's digital locker.

As an alternative or in addition to comparing selected items to consumer profile information, items in an electronic shopping cart may be compared to one another to determine whether they are consistent and/or compatible with each other. Again, if an inconsistency or incompatibility is detected or if a predetermined level of inconsistency or incompatibility is detected, the consumer is notified and requested to confirm the purchase of the items.

As yet another alternative, a combination of selected items may be compared against other previously purchased combinations by any user. If the particular selected combination corresponds to a previously purchased combination that resulted in a return, the consumer may be notified and may be further requested to provide confirmation regarding the consumer's purchase. Similarly, if the purchase does not correspond to any previous purchase combination, the consumer is notified and requested to provide confirmation regarding his or her purchase.

With regard to inconsistencies and incompatibilities, an inconsistency exists when two items differ with regard to related or shared aspects. For example, a movie may be available on digital video disk ("DVD") formatted in both full screen and wide screen editions. While DVDs may contain the same content (i.e., the same movie), the DVDs (full screen vs. wide screen) differ or are inconsistent with regard to their display characteristics. Similarly, a wide screen edition of a DVD movie may be inconsistent with consumer preferences. With regard to incompatibilities, two items are incompatible if they are not inter-operable according to some aspect of their intended use. For example, a particular movie distributed on DVD is incompatible with a VHS tape player. Similarly, a Sony Playstation® video game is incompatible with a Nintendo GameCube® game console. Still further, but perhaps more subtle to a consumer, is DVD regional coding, i.e., a DVD movie encoded with a regional code for a first geographic region is incompatible with a DVD video player encoded with a regional code for a second geographic region. Of course, DVD regional encoding is one aspect of a larger, digital rights management context, which is discussed in greater detail below.

While the terms "inconsistency" and "incompatibility" are frequently used together in the following discussions, in many instances they may also be used synonymously. Moreover, while technically distinct, an incompatibility may be viewed as an inconsistency, and perhaps a "strong" inconsistency. Thus, in the following discussion, if the term "inconsistent" or its derivatives is used alone (i.e., without the term "incompatible" and also without explicit statements to the contrary), it may be construed to include both inconsistency and/or incompatibility.

As an additional preliminary definition, inconsistencies and incompatibilities may be gouped into known inconsistencies and incompatibilities and perceived inconsistencies and incompatibilities. Known inconsistencies and incompatibilities refer to those inconsistencies and incompatibilities that a system knows to exist. For example, with regard to the example above, a system adapted according to the present invention may know that a Sony Playstation® video game is incompatible with a Nintendo GameCube® game console. Alternatively, perceived inconsistencies and incompatibilities refer to those inconsistencies and incompatibilities that the system suspects, assumes, or anticipates will exist. Perceived inconsistencies and incompatibilities are generally, but not exclusively, found in regard to purchasing a combination of items that has not previously been purchased or, if purchased, typically results in a return. Additionally, if the terms inconsistency and incompatibility are used without the terms "known" or "perceived," they should be interpreted as "known and/or perceived" inconsistencies and/or incompatibilities.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. Persons skilled in the field of processing purchase transactions will recognize components and process steps described herein that may be interchangeable with other components or steps, or combinations of components or steps, and still achieve the benefits and advantages of the invention.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

With regard to the operating environment for the present invention, while there are numerous environments in which purchase transactions may occur, FIG. 1 illustrates an exemplary networked environment 100 suitable for conducting purchase transactions, and further suitable for detecting known or perceived inconsistencies and/or incompatibilities in such transactions, as well as advising the consumer of the detected condition. The exemplary networked environment 100 of FIG. 1 includes one or more consumer devices, such as consumer devices 102-106, by which a consumer (not shown) can conduct a purchase transaction. The consumer devices communicate via a communication network, such as the Internet 108, with a network shopping service 110.

Consumer devices, such as consumer devices 102-106, are typically computing devices including a variety of configurations or forms such as, but not limited to, laptop or tablet computers, personal computers, personal digital assistants (PDAs), hybrid PDA/mobile phones, mobile phones, workstations, and the like. The general architecture of a consumer device is described below in regard to FIG. 2.

Figure 2:
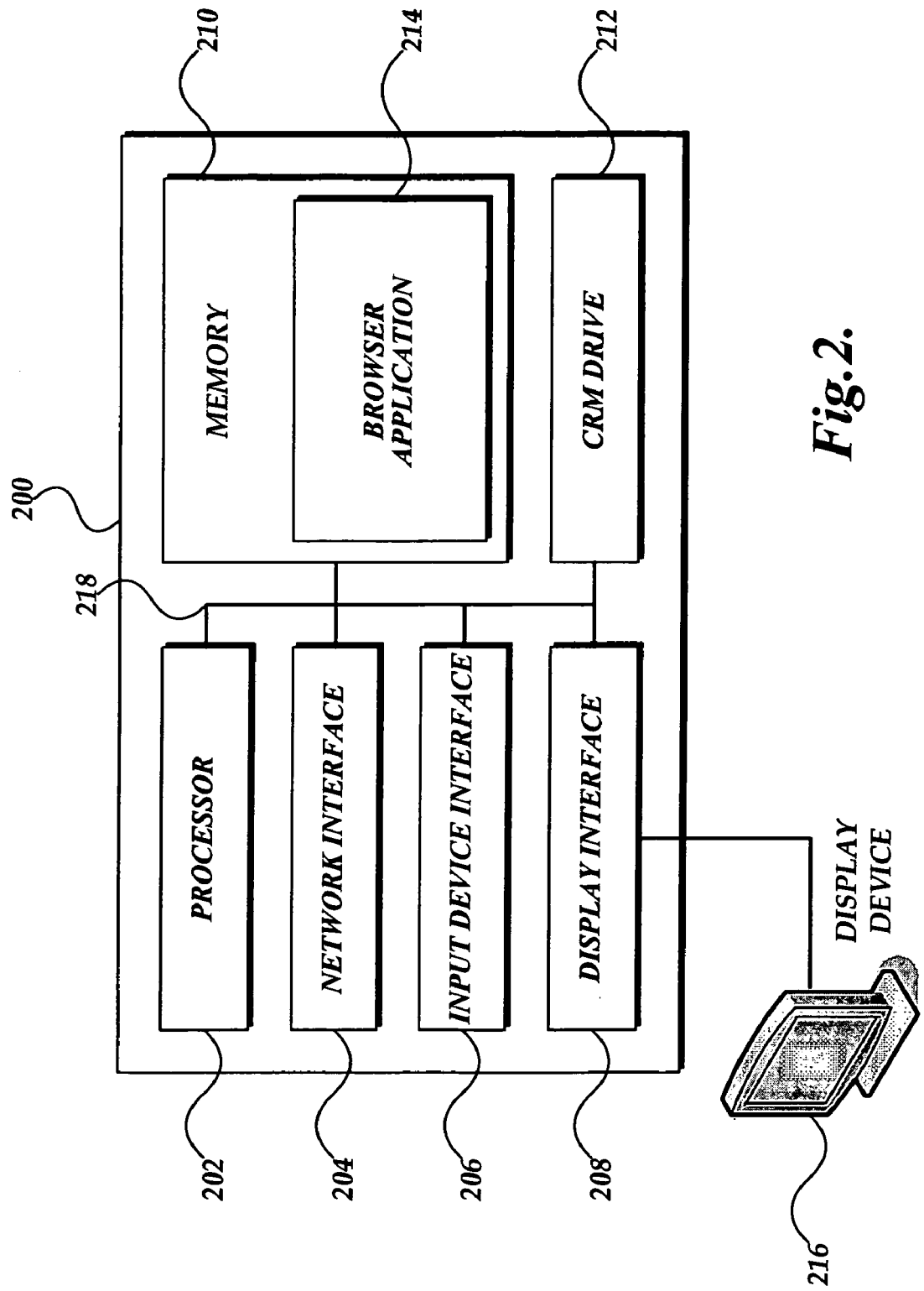
FIG. 2 is a block diagram illustrating exemplary components of a consumer device suitable for conducting purchase transactions within the networked environment depicted in FIG. 1.

FIG. 2 is a block diagram illustrating exemplary components of a consumer device suitable for conducting a purchase transaction via the Internet 108. Of course, while various components are described below, those skilled in the art of computers will recognize a wide selection of commercially available components that can be used to construct a consumer device suitable for conducting purchase transactions. Accordingly, the following description of the exemplary components of a consumer device should be viewed as illustrative only, and not construed as limiting in any manner.

With regard to FIG. 2, the illustrated consumer device 200 includes a processor 202 in communication with a variety of other components over a system bus 218. The exemplary components include, by way of example, a network interface 204, an input device interface 206, a display interface 208, a computer-readable medium drive 212, and a memory 210. As appreciated by those skilled in the art, the network interface 204 enables the consumer device 200 to communicate data, control signals, data requests, and other information with a computer network, such as the Internet 108 (FIG. 1). The network interface 204 may be configured to communicate with the Internet 108 over a wired or wireless connection.

The input device interface 206, sometimes also embodied as an input/output interface, enables the consumer device 200 to obtain input from the consumer, part of which is directed to the purchase. Input devices in communication with the input device interface 206 may include, but are not limited to, a digital pen, a touch screen, a keyboard, a mouse, and the like. In addition, a display interface 208 is typically connected to a display device 216 (e.g., a CRT monitor, an LCD screen, a television, etc.) for visually displaying information to the consumer. Those skilled in the art will appreciate that the display device 216 may be incorporated within a consumer device as an integral element of the consumer device or, alternatively, may be an external component that is attached to the consumer device. FIG. 2 illustrates that the display device 216 is external to the consumer device 200, but this is illustrative only.

The processor 202 is configured to operate in accordance with programming instructions stored in a memory, such as the memory 210. The memory 210 generally comprises RAM, ROM, and/or permanent memory. Thus, in addition to storage in read/write memory (RAM), programming instructions may also be embodied in read-only format, such as those found in ROM or other permanent memory.

The memory 210 also typically stores an operating system (not shown) for controlling the general operation of the consumer device 200. The operating system may be a general purpose operating system such as a Microsoft® operating system, UNIX® operating system, or Linux® operating system, or an operating system specifically written for and tailored to the consumer device 200. The memory 210 may further store user-executable applications or programs for conducting various functions on the consumer device 200. For example, FIG. 2 illustrates that memory 210 includes a browser application 214 that may be used by the consumer to navigate on the Internet 108 and through which the consumer may communicate via the Internet 108 to conduct a purchase transaction with the network shopping service 110. Examples of such browser applications include Microsoft's Internet Explorer®, Mozilla's Firefox, and the like.

The computer-readable medium drive 212 provides an optional and alternative means by which a consumer may store information externally and/or retrieve external information. Examples of computer-readable medium drives include, but are not limited to, CD ROM drives, DVD ROM drives, floppy disk drives, flash memory card readers, network drives, and the like. Of course, while computer-readable medium drive 212 is shown in the exemplary consumer device 200, it should be viewed as an optional component. Those skilled in the art will appreciate that not all consumer devices include a computer-readable medium drive 212. However, regardless of whether or not a consumer device includes a computer-readable medium drive 212, the consumer device may be entirely suitable for conducting purchases and receiving notices of known or potential inconsistencies and/or incompatibilities during a purchase transaction.

With reference again to FIG. 1, the consumer devices 102-106 are connected to a network shopping service 110 via a communication network, such as the Internet 108. As illustrated in FIG. 1, the service 110 may comprise one or multiple servers or discrete components to conduct a retail presence over the network. For example, as shown in FIG. 1, the illustrated service 110 is comprised of multiple components including a retail server 112 that provides the "front end" to consumers, a catalog server 114 that provides general catalog information for items available for purchase from the service, and an evaluation server 116 that evaluates transactions to detect and warn of known or potential inconsistencies or incompatibilities.

Those skilled in the art will appreciate that the various servers/components depicted in FIG. 1 are illustrative only. As mentioned above, an actual embodiment of a network shopping service 110 may be comprised of a single computer or a plurality of discrete, cooperative servers distributed in a communications network. Similarly, the identified components should be viewed as logical components, as each component may be physically embodied on one or more computer systems, as well as combined with other hardware and/or software components not illustrated herein.

Figure 3:
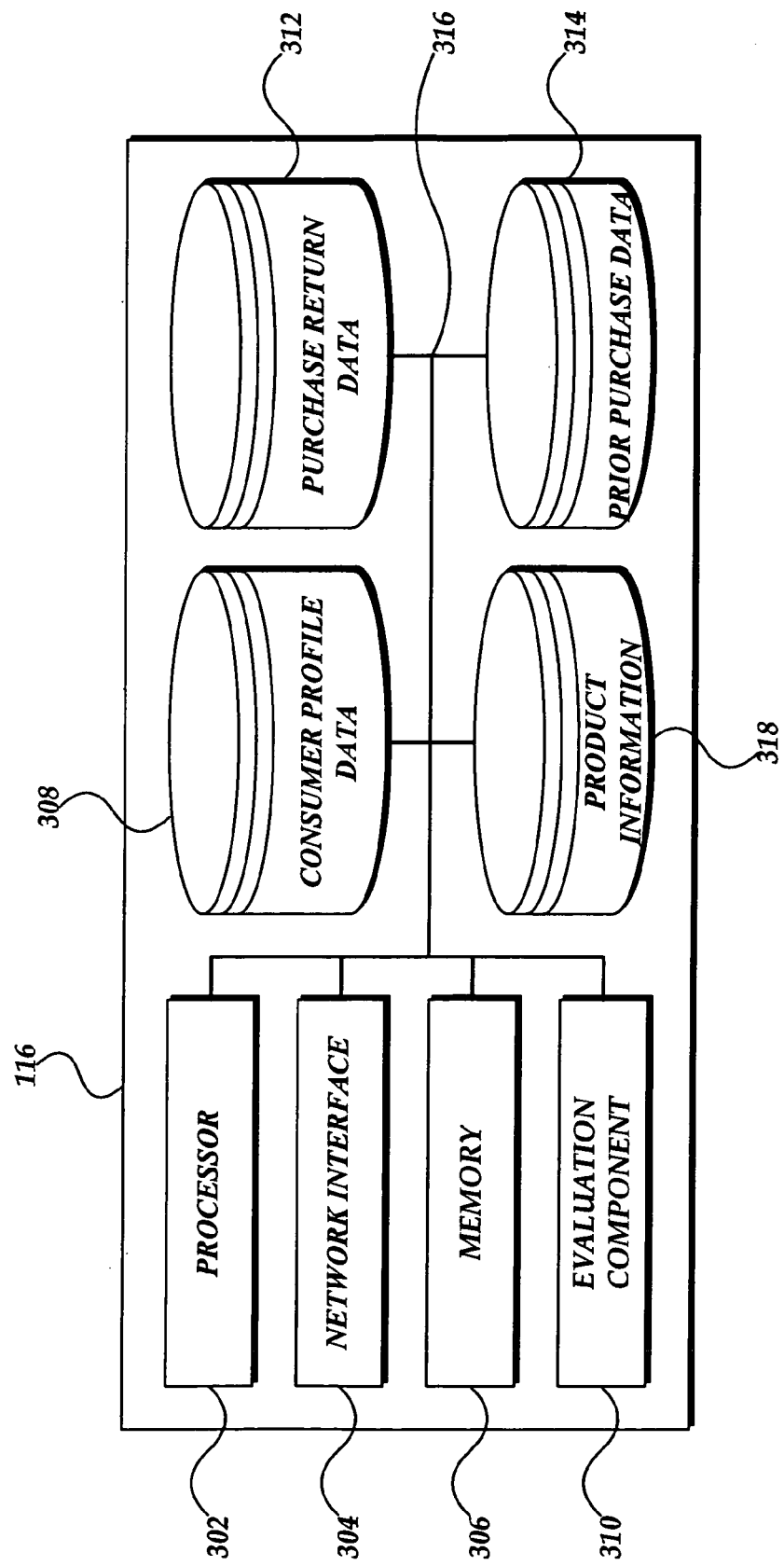
FIG. 3 is a block diagram illustrating exemplary components of an illustrative evaluation server suitable for use in conducting a purchase transaction within the networked environment depicted in FIG. 1 and for detecting and warning of inconsistencies and/or incompatibilities in such a transaction.

With regard to the network shopping service 110 detecting known or potential inconsistencies or incompatibilities, FIG. 3 is a block diagram illustrating exemplary components of the evaluation server 116 that are suitable for conducting purchase transactions and suitable for detecting and warning of inconsistencies or incompatibilities in those transactions. More particularly, with regard to the evaluation server 116, as shown, the server is implemented as a single integrated device; although, as indicated above, this is illustrative only.

The evaluation server 116 includes a processor 302 in communication with a variety of other components over a system bus 316. The exemplary server components also include, but are not limited to, a network interface 304, a memory 306, and an evaluation component 310, as well as various data stores, such as a consumer profile data store 308, a prior purchase data store 314, a product information data store 318, and a purchase return data store 312.

As with the consumer device 200, the processor 302 is configured to operate in accordance with programming instructions stored in a memory 306, which is generally comprised of RAM, ROM, and/or other permanent memory. The memory 306 will typically store an operating system for the evaluation server 116 upon which, and with which, most other programs/applications operate. Additionally, the memory 306 will include one or more programs or applications that constitute a virtual storefront, including functions (not shown) such as a front-end handling routine for processing requests from consumer devices, catalog services, transaction processing modules, and the like.

The evaluation component 310 evaluates items selected by a consumer for purchase to determine whether any known or potential inconsistencies and/or incompatibilities exist, such as inconsistencies/incompatibilities with the consumer's purchase history, preferences, wish lists, etc. While shown as a component within the evaluation server 116, the evaluation component 310 may alternatively be implemented as an application that is stored within the memory 306 and executed in conjunction with conducting a purchase transaction, a logical component of the service 110, or as a separate server 116 (as shown in FIG. 1) within the networked environment. Additionally, while the functionality of the evaluation component 310 serves an important part of detecting inconsistencies and/or incompatibilities, it may be implemented differently in a variety of embodiments. To that end, the functionality of the evaluation component 310 will be discussed in greater detail below.

Returning to FIG. 3, the consumer profile data store 308 includes information regarding a consumer's purchase history, consumer-supplied preference information, and/or additional information related to the identified consumer. The consumer's purchase history may be used to evaluate whether items selected for purchase are consistent with the consumer's previous purchases. Other information may be stored in the consumer profile data store 308, including, but not limited to, consumer supplied preferences, ratings, wish lists, browsed items, preferred selections, and current, similar, or related items that the consumer owns (as found in a digital locker or otherwise), all or some of which may be used by the evaluation component 310 to determine whether there are inconsistencies or incompatibilities with the selected items.

Still further information that may be placed or stored in the consumer profile data store 308 includes digital rights management (DRM) information corresponding to the consumer. For example, the consumer profile data store 308 may include DRM information associated with the consumer regarding current licenses to access content, regional encoding, specific devices upon which content or services may be used, information authorizing a limited number of downloads to alternative devices, installation licenses, and the like.

With regard to consumer profile information, it should be appreciated that not all consumer profile information must or will be stored in the consumer profile data store 308. Instead, some consumer profile information may be determined according to a particular set of circumstances or context relating to the selection of the item or items. More particularly, as those skilled in the art will recognize, when a consumer device 102 connects to a network shopping service 110 over a network, such as the Internet 108, a substantial amount of information regarding the consumer device 102 is readily available.

For instance, in the context of a communication session between a consumer device 102 and a network shopping service 110, information such as the consumer device's operating system, the network browser currently being used in the communication session, and the like, is readily ascertainable by a network shopping service 110. Clearly, this "contextual" information, though determined "on the fly" rather than retrieved from the consumer profile data store 308, may be viewed and used as vital consumer profile information for detecting inconsistencies and/or incompatibilities. As an example of the use of context-based consumer profile information, when a consumer connects to a network shopping service using a PDA, the network shopping service 110 can determine the PDA's operating system. Assuming that the network shopping service 110 determines that the consumer's PDA uses a PalmOS® operating system, any attempt to download a PDA game written exclusively for PDAs using a Microsoft operating system should likely be viewed by the network shopping service 110 as an inconsistency and/or incompatibility.

While context-based consumer profile information may be determined "on the fly," in various embodiments context-based consumer profile information, once determined, may be stored in the consumer profile data store 308. For example, once it is determined, from a communication context that a consumer owns (or at least uses) a PalmOS-based PDA, that contextual information may be stored in the consumer profile data store 308 for future reference. Storing (or not storing) context-based consumer profile information in the consumer profile data store 308 may be a matter of system design/implementation, individual vendor or network shopping service policies, determined and configured according to consumer preferences, or any combination thereof.

The consumer profile data store 308 (and/or prior purchase data store 314, described below) may also include a reference to or identification of the age or aging of the information stored therein. This information could then be considered in detecting inconsistencies. For example, in 1999 a consumer may have purchased numerous VHS edition movies. However, in view of the widespread adoption of DVD players since that time, the VHS purchases should probably have no bearing on the current purchase of a high definition DVD video player. Accordingly, aspects of the invention may be configured to consider the age or aging of the information in the consumer profile data store 308 (and/or prior purchase data store 314, described below).

With regard to age-limiting information in the consumer profile data store 308 and/or prior purchase data store 314, a cut-off date may be implemented to limit the consideration of purchase history information that was generated prior to the cut-off date. Other, more sophisticated algorithms or data models could also be used to determine the degree to which aging user profile information should be considered when determining whether an inconsistency or incompatibility exists. For example, an aging curve associated with a particular category or type of item could be implemented so that, as the purchase history related to the category ages, the degree to which the purchase history is considered in the inconsistency determination decreases according to the aging curve. In one embodiment, the aging curve can be implemented such that the degree to which the purchase history is considered in the determination is reduced as a straight line for each year of the age of data. In yet other embodiments, the aging curve may be implemented as a logarithmic or other suitable weighting function. In yet another embodiment, a particular event, i.e., a triggering event, may cause the age/aging information to be updated to conform to new "realities." More particularly, and continuing the example above with regard to the purchase of a high definition DVD video player, the fact that a consumer purchases a high definition DVD video player may be viewed as a triggering event, such that the cut-off date or aging curve previously established with regard to the relevancy of the purchased VHS tapes is accelerated or updated to the present time. In reality, once the consumer has purchased a high definition DVD video player, he or she will likely now purchase movies on DVD video disks, not VHS tapes. Thus, the aging information is accelerated to the time that the consumer purchases the high definition DVD video player (the triggering event) such that any prior purchases of VHS tapes are no longer relevant.

It will be appreciated that the aforementioned examples are for illustrative purposes only, and thus, are not to be construed as limiting. Moreover, it will be appreciated that these aspects may be user configurable, fixed for a particular network shopping server 110, or determined heuristically by the network shopping server 110.

As will be readily appreciated, unintentionally purchasing an item that is inconsistent or incompatible with items of previous purchases can greatly inconvenience a consumer and, thus, may result in the return of an item. However, by ensuring that selected items are consistent and compatible with the consumer's intent, both the vendor and consumer may be benefited.

In one embodiment, the consumer-supplied preference information in the consumer profile data store 308 may include configurable information with regard to how a consumer is notified of inconsistencies and/or incompatibilities, as well as for which inconsistencies and/or incompatibilities the user should be notified. For example, the consumer-supplied preference information may include information indicating whether or not a consumer wishes to be notified when a duplicate item is selected for purchase. Alternatively, or in addition, the consumer-supplied preference information may include information indicating the circumstances under which a consumer wishes to be notified (or not) of an inconsistency and/or incompatibility. More specifically, a consumer may be provided with an option to "turn off" (or conversely, "turn on") notification of inconsistencies with respect to a category, type, or other aspect of an item, e.g., for books, electronics, software, video, and the like. For example, a librarian may want to turn off notification with regard to inconsistencies when purchasing books, but still be notified regarding inconsistencies with regard to other categories of items. More generally, the consumer may configure the consumer-supplied preference information such that only certain aspects of a selected item are used to determine inconsistency/incompatibility or, alternatively, that certain aspects are ignored with regard to determining inconsistencies or incompatibilities. As will be discussed below, thresholds, percentages, and levels of indirection may also be established for use in determining whether inconsistencies or incompatibilities exist.

In yet another embodiment, the consumer may be provided with an option to "turn off" (or conversely "turn on") notification of inconsistencies when selecting items for another person or entity (e.g., a gift recipient). For example, if a consumer has identified a particular item or set of items as a gift for another person (the recipient), a determination of inconsistency or incompatibility with the consumer's profile information may be irrelevant. Accordingly, the consumer may want to turn off notification with regard to inconsistencies when selecting items for others.

The purchase return data store 312 relates to another aspect of purchase transactions that may be evaluated by the evaluation component 310 for inconsistencies or incompatibilities of selected items. More particularly, the purchase return data store 312 includes records of combinations of items previously purchased and an indication as to whether those combinations typically resulted in the return of at least one item. The return of an item from a prior purchase may be an indicator of an inconsistency or incompatibility. Accordingly, in one embodiment of the invention, when a selected combination of items corresponds to combinations in the purchase return data store 312 that resulted in the return of an item, a warning may be issued to the consumer with a confirmation request to confirm the validity of the selected combination.

The prior purchase data store 314 includes records of a statistically significant number of previous purchases from a plurality of consumers via the network shopping service 110. Moreover, the prior purchase data store 314 represents yet another aspect of evaluation that may be applied to a current purchase to determine whether any selected items represent an inconsistency or incompatibility for the consumer. For example, data from the prior purchase data store 314 may be used to detect an inconsistency or incompatibility between a selected item and an item already owned/purchased by the consumer. As with the other data stores, a further discussion of how the information in the prior purchase data store 314 may be used to detect inconsistencies and/or incompatibilities is set forth below. Additionally, while the purchase return data store 312 and the prior purchase data store 314 are identified as distinct data stores, these are logical separations only and not intended to be viewed as limiting. In one embodiment, purchase return data store 312 and prior purchase data store 314 are embodied in the same physical data store.

The product information data store 318 includes information regarding all products and services available from the network shopping service 110. The evaluation component 310 uses the information in the product information data store 318 to identify aspects of items (including goods and services) that can be compared for inconsistencies and/or incompatibilities.

As mentioned above, a first basis for identifying inconsistencies and/or incompatibilities in a purchase transaction is to evaluate items selected for purchase against information in the consumer profile data store 308. Inconsistencies or incompatibilities may be based on or related to any number of item-related aspects such as, but not limited to, a particular format, inter-operability, traits, form, type, vendor, and the like. Of course, in addition to comparing selected items against previously purchased items, the selected items may similarly be compared against other information in the consumer's profile, such as the consumer-supplied preferences discussed above. With regard to inter-operability, an inconsistency and/or incompatibility may be found when a selected item is not inter-operable with another item. For example, a software utility written for an Apple OS X computer is not inter-operable with a computer running Microsoft's Windows XP operating system. Similarly, an electrical appliance designed to operate on 110 volt AC current (as found in the United States) is not inter-operable with 220 volt AC electrical systems (as found in many European nations), and therefore an inconsistency/incompatibility may exist. Traits may include design, size, color, duration, appearance, and the like. As an example of traits with regard to inconsistencies/incompatibilities, a model train hobbyist building an era-authentic nineteenth century "world" will find a bullet train model engine to be inconsistent with the nineteenth century world. Similarly, when painting one's house, a variation in the color of a paint (even though the paint may be of the same brand and type) would certainly be viewed as an inconsistency or incompatibility. As an example of inconsistencies with regard to type, there are many types of flash memory devices (Smart-Media, compact flash, xD, secure digital, memory stick, etc.). However, many digital devices utilize a specific type of flash memory, i.e., an Olympus digital camera may exclusively use xD flash memory devices such that any other type of flash memory is inconsistent and incompatible with the camera.

Figure 4A:
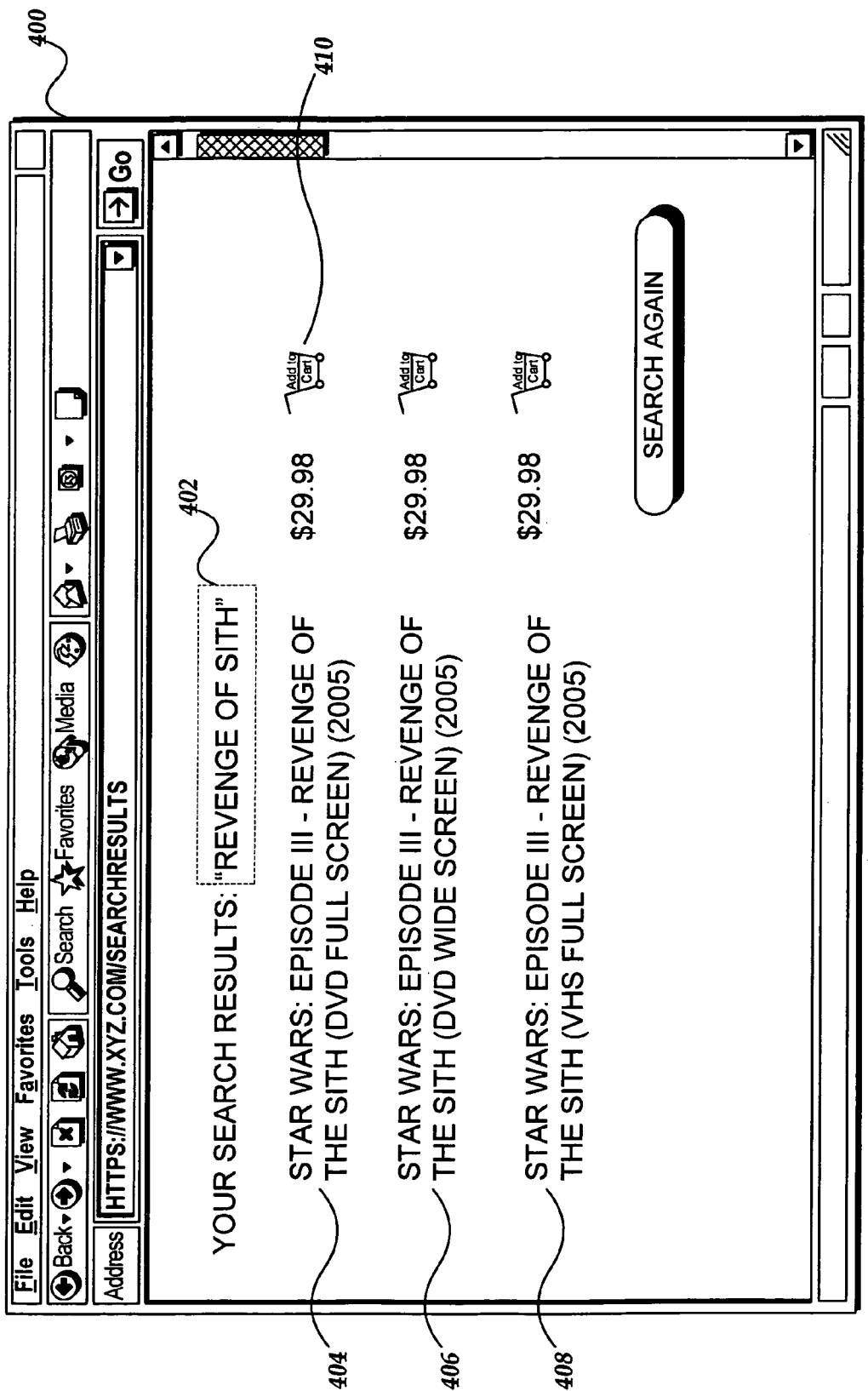
FIGS. 4A-4B are pictorial diagrams of exemplary screen displays generated on a consumer device while conducting a purchase transaction for an item which is inconsistent with the consumer's profile information.
Figure 4B:
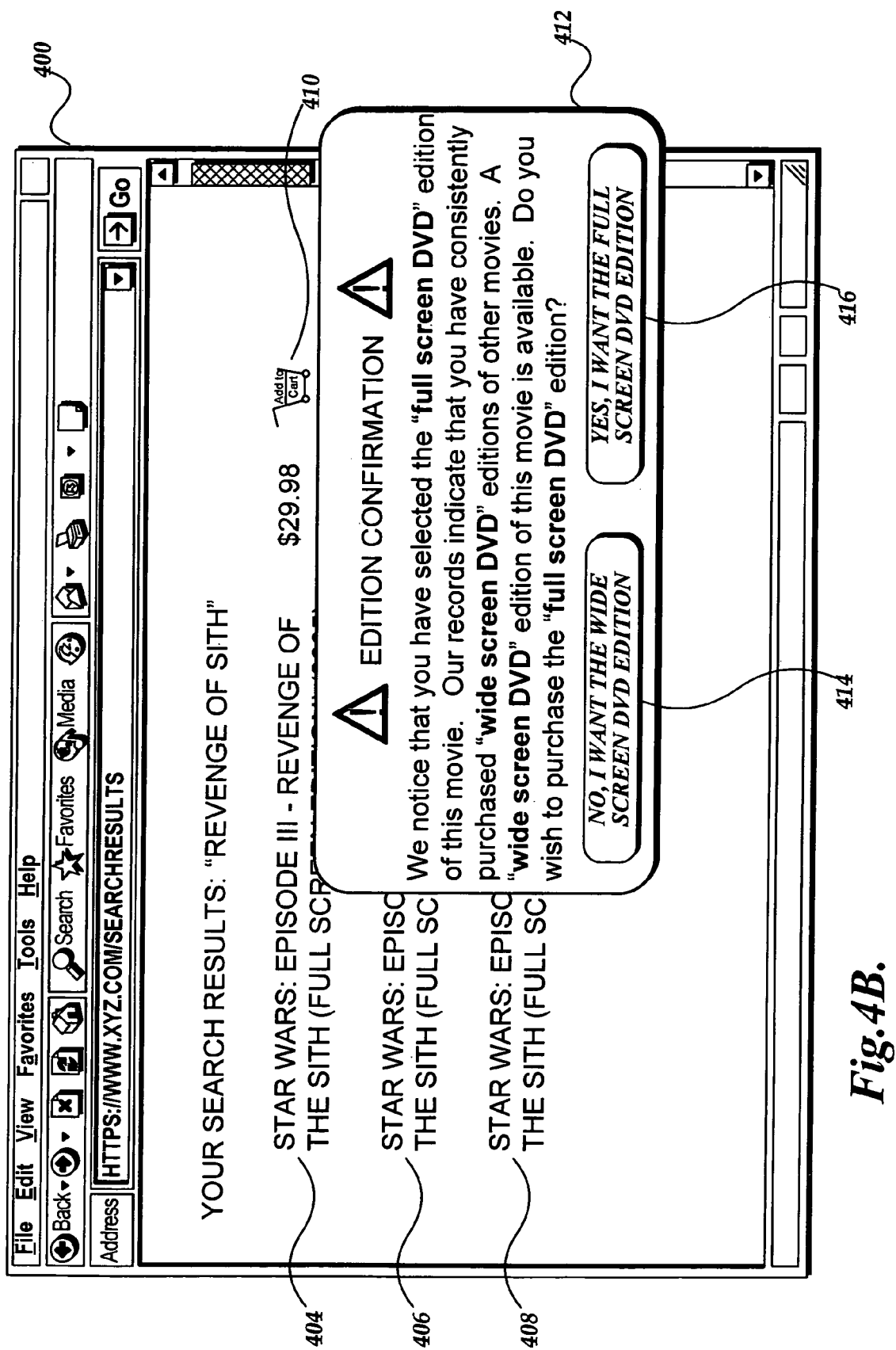

To illustrate the detection of inconsistencies between a selected item and consumer profile information, FIGS. 4A and 4B are pictorial diagrams of exemplary screen displays generated on a consumer device while selecting a movie on DVD whose format is inconsistent with the consumer's previous purchases. In particular, FIG. 4A illustrates an exemplary screen display 400 reflecting the results of a search performed with the network shopping service 110 for a particular movie based on the search terms 402, "revenge" and "sith." The screen display 400 includes three matching items, result items 404-408, found as a result of the searching. As typical with search results, the items are displayed to the consumer with limited information about each item, though each result item is typically provided as a hyperlink to additional detailed information regarding that particular item.

As can be seen in FIG. 4A, while there were three result items that matched the search terms and each result item apparently relates to the same "movie," each result item 404-408 relates to a separate item in the catalog maintained by the catalog server 114 of the network shopping service 110. More particularly, result item 404 is a full-screen DVD edition of the movie; result item 406 is a wide-screen DVD edition of the movie; and result item 408 is a VHS full-screen edition of the movie.

Continuing with this example, assume that the consumer has a prior history of movie purchases with the network shopping service 110. More specifically, it is assumed that the consumer has consistently purchased wide-screen DVD editions even when other editions and formats, such as full-screen DVD editions or VHS editions, are available. Other information may also be available and relevant, such as the fact that the consumer has recently purchased a wide-screen television from the vendor. In light of these details being available to the network shopping service 110, if the consumer inadvertently selects the "add to cart" icon 410 associated with a full-screen DVD edition of the movie, such selection represents an inconsistency with the available information, and possibly an indication that the DVD will be returned.

According to one aspect of detecting inconsistencies and incompatibilities, when an item is selected for purchase, aspects of the selected item are evaluated against the consumer's profile information, e.g., the consumer's purchase history, to determine whether the selected purchased item is consistent with that information. If the selected item is determined to be inconsistent with the consumer's profile information, the consumer is warned of the inconsistency and asked to confirm whether the consumer wishes to proceed with the purchase. Thus, in the present example, if the consumer activates the "add to cart" icon 410, the evaluation server 116 would detect the inconsistency between the selected full-screen edition and the previously purchased wide-screen editions identified in the consumer's profile information as stored in the consumer profile data store 308 and/or prior purchase data store 314. Due to this detected inconsistency, the consumer is queried as to whether the (inconsistent) selection was intentional. FIG. 4B illustrates the exemplary screen display 400 from FIG. 4A along with a confirmation window 412. The confirmation window 412 is displayed as a result of the evaluation server 116 detecting an inconsistency between the selected movie's format and information in the consumer's profile that, in this example, indicates that the consumer has consistently purchased wide-screen DVD editions and also recently purchased a wide-screen television. In the illustrated confirmation window 412, the evaluation server 116 identifies the inconsistency to the consumer and requests that the consumer either confirms the addition of the full-screen DVD edition via confirmation button 416, or substitutes the selected item with the wide-screen DVD edition via confirmation button 414. Of course, even when an inconsistency between a selected item and previously purchased items exists, the consumer may want to purchase the particular item selected. Accordingly, the network shopping service 110 should not attempt to restrict what the consumer ultimately chooses.

While the above-described example presents a substitute item (if available) to the consumer for the consumer's selection, according to alternative embodiments of the invention, if a substitute item is available, a substitution is made automatically, i.e., without consumer notification and confirmation. Additionally, the consumer profile information in the consumer profile data store 308 may include configuration information indicating when and under what circumstances automatic substitutions should be made.

Figure 5A:
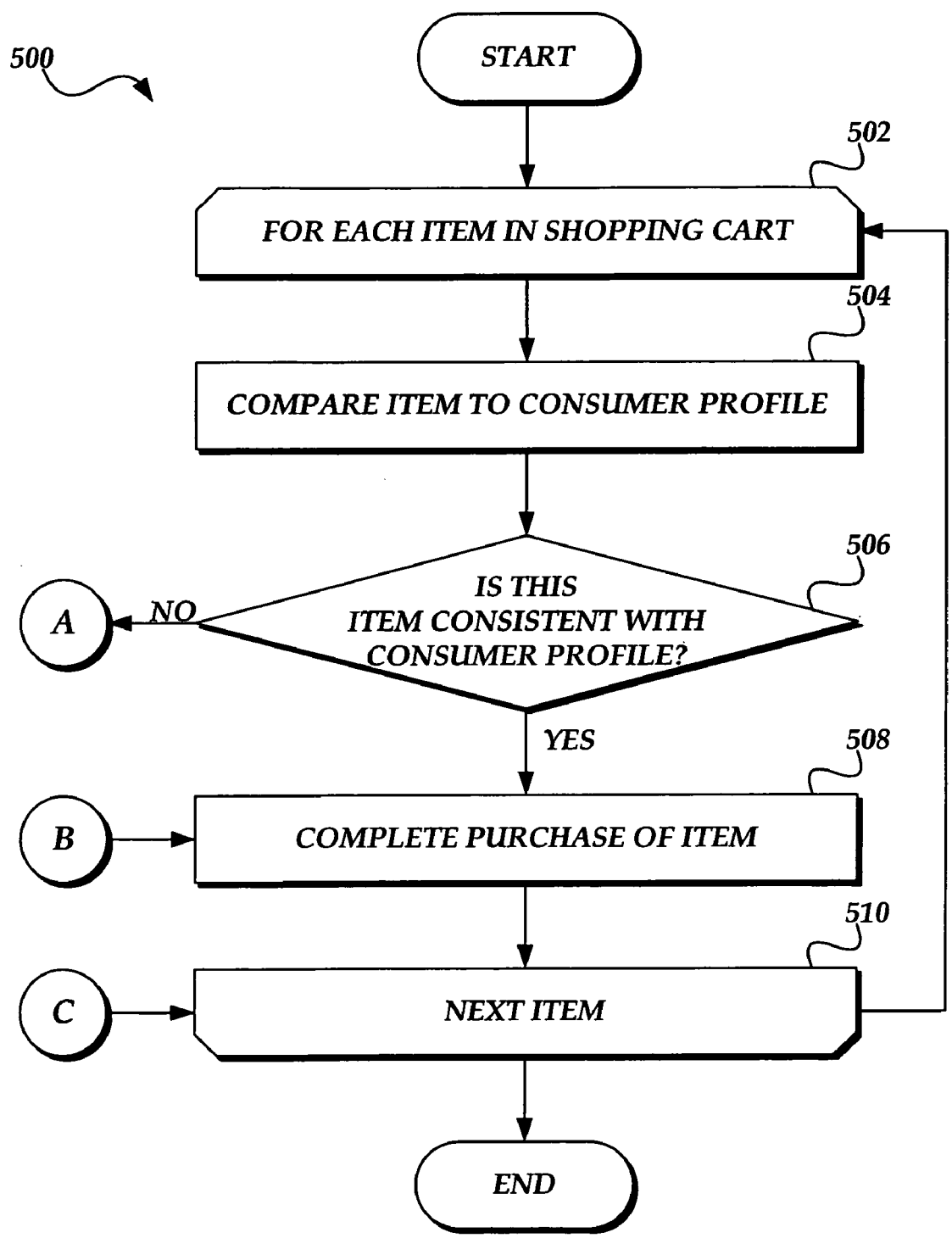
FIGS. 5A-5B are a flow diagram of an exemplary routine for detecting inconsistencies between a selected item and a consumer's profile information.
Figure 5B:
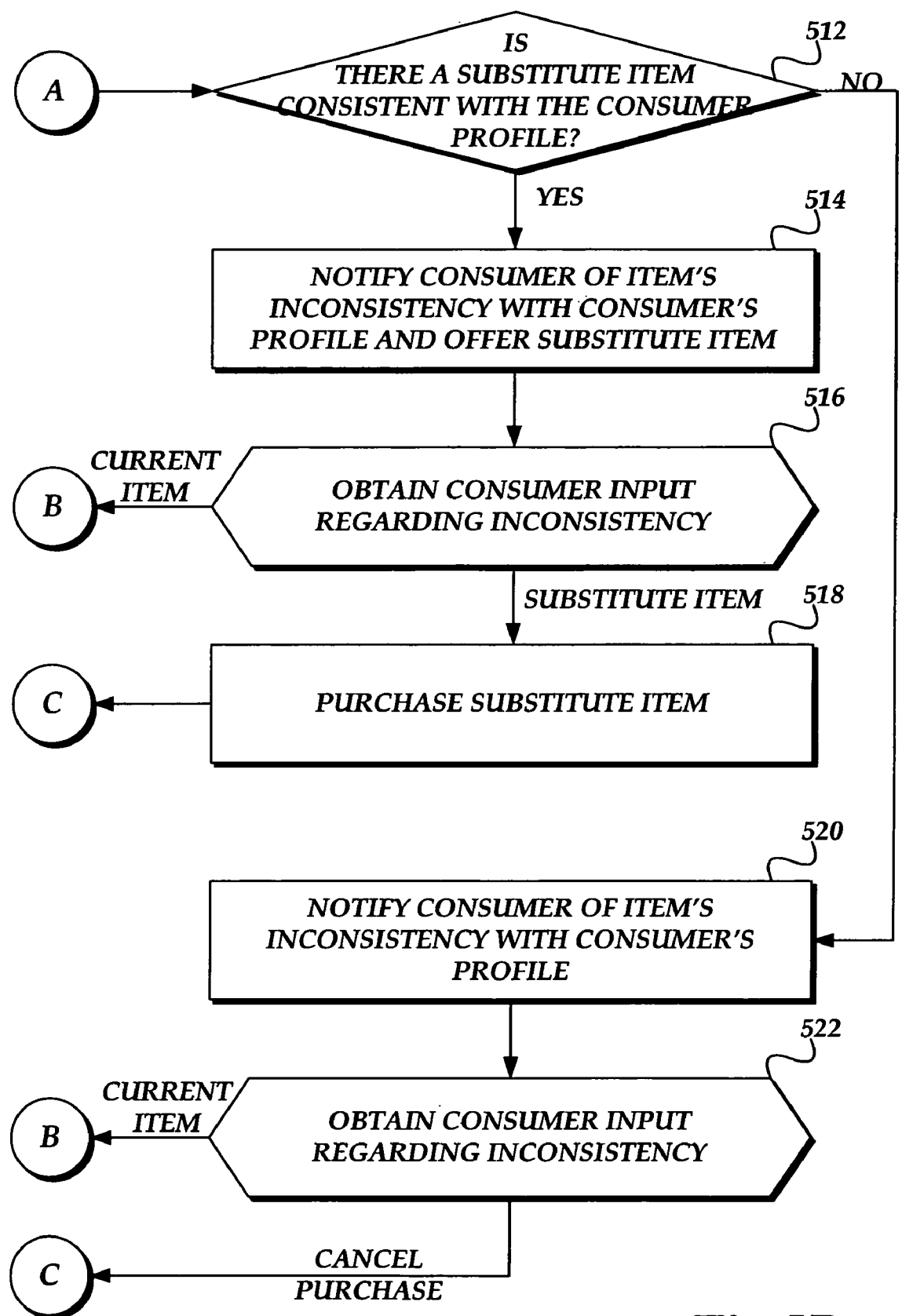

In regard to detecting inconsistencies with regard to a consumer's profile information, including, for example, the consumer's prior purchases, FIGS. 5A-5B are a flow diagram of an exemplary routine 500 that may be implemented by the evaluation server 116 for detecting inconsistencies between a purchase selection and the consumer's profile information.

The following discussion is directed to evaluating items for purchase (e.g., items found in an electronic shopping cart) at the time of purchase. However, the exemplary routine 500 may be suitably adapted to evaluate individual items as they are placed in an electronic shopping cart or elsewhere in the purchase process (as illustrated by the above example with regard to FIGS. 4A and 4B) or during a browsing session.

With regard to the exemplary routine 500, at control block 502 (FIG. 5A), an iteration is begun to evaluate each item in the electronic shopping cart. The iteration includes the steps identified between control block 502 and its corresponding end control block 510. To begin the iteration, at block 504, a current item is compared against the consumer's profile information (such as found in consumer profile data store 308 and/or prior purchase data store 314), including consumer preferences, prior purchase history, ratings, wish list, and the like.

At decision block 506, a determination is made as to whether the selected item is consistent with the consumer's profile information. If the selected item is consistent with the consumer's profile information, at block 508 the item is purchased. Thereafter, at end control block 510, if there are other items to be processed, the routine 500 returns to control block 502, selects another item, and continues as described above. Alternatively, if at decision block 506, the selected item is not consistent with the consumer's profile information, the routine 500 proceeds to decision block 512 (FIG. 5B).

At decision block 512, a determination is made as to whether there is a suitable substitute item consistent with the consumer's profile information. If there is no substitute item, the routine 500 proceeds to block 520 where the consumer is notified of the item's inconsistency. At block 522, the exemplary routine 500 obtains the consumer's input as to whether to proceed with the purchase of the current item, or to cancel its purchase. If the consumer indicates a desire to purchase the item, the routine proceeds to block 508 (FIG. 5A) where the item is purchased. Alternatively, if the consumer cancels the purchase, the routine proceeds directly to end control block 510 for further iterations, as described above.

If, at decision block 512, there is a substitute item, the routine 500 proceeds to block 514. At block 514, the consumer is notified of the inconsistency as well as the consistent substitute item. FIG. 4B illustrates one example (confirmation window 412) of such a notification. At block 516, the exemplary routine 500 obtains the consumer's input as to whether to proceed with the purchase of the current item or purchase the substitute item. If the consumer indicates a desire to purchase the current item, the routine proceeds to block 508 (FIG. 5A) where the item is purchased. Alternatively, if the consumer indicates a desire to purchase the substitute item, at block 518 the substitute item is purchased and the routine proceeds to end control block 510 for further iteration.

The routine 500 continues its iteration through all items in the consumer's electronic shopping cart until, at end control block 510, there are no other items in the cart to be processed. Thereafter, the routine 500 terminates.

It should be appreciated that at the conclusion of a purchase transaction, and in an effort to more accurately identify inconsistencies and incompatibilities, information regarding purchased items may be stored in the consumer profile data store 308 as well as prior purchase data store 314 (FIG. 3). In this manner, accurate consumer profile information is obtained and maintained for the benefit of the consumer and the network shopping service 110.

Figure 6A:
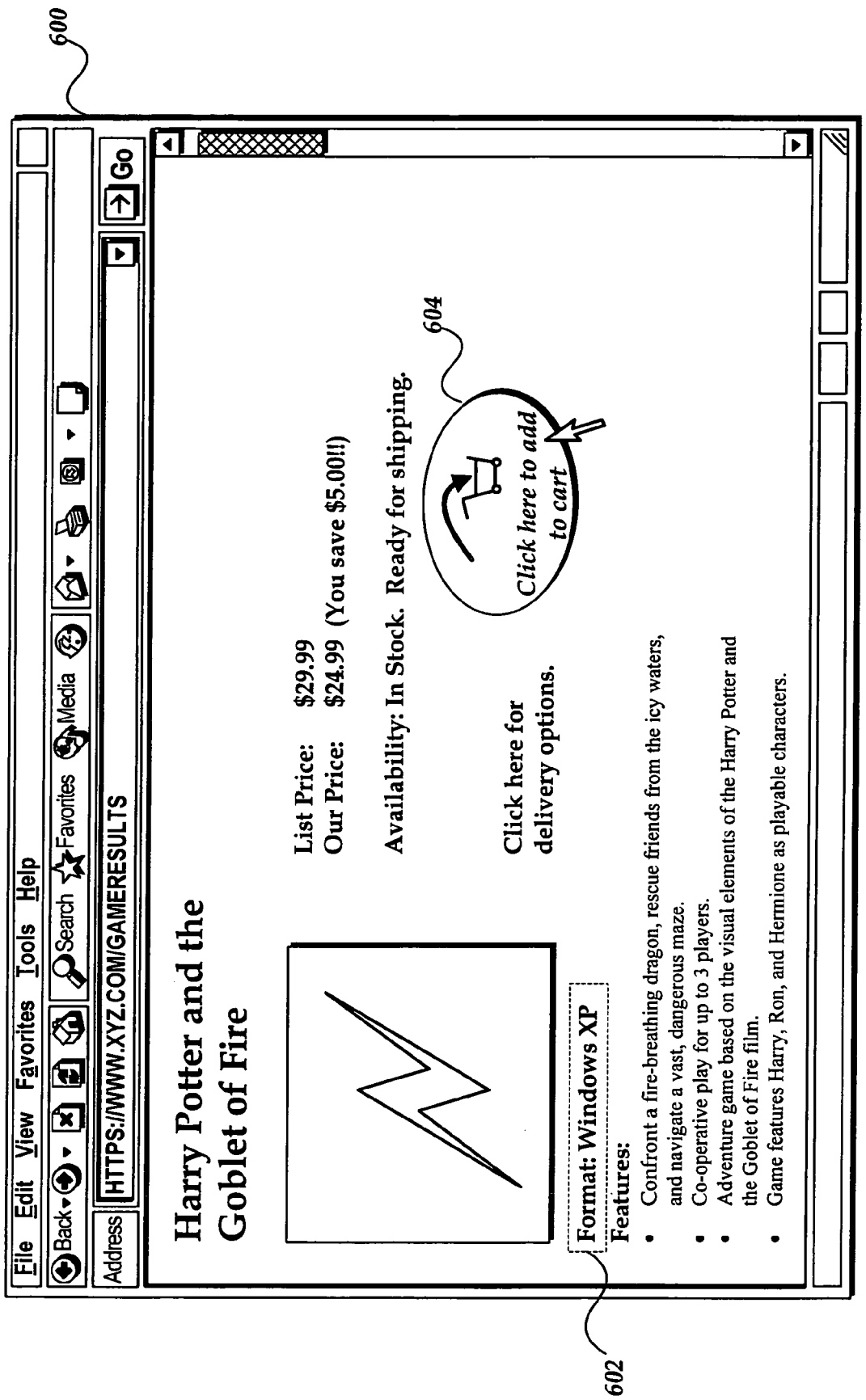
FIGS. 6A-6B are pictorial diagrams of exemplary screen displays generated on a consumer device while conducting a purchase transaction for multiple items in which at least one item is inconsistent with another item in an electronic shopping cart.
Figure 6B:
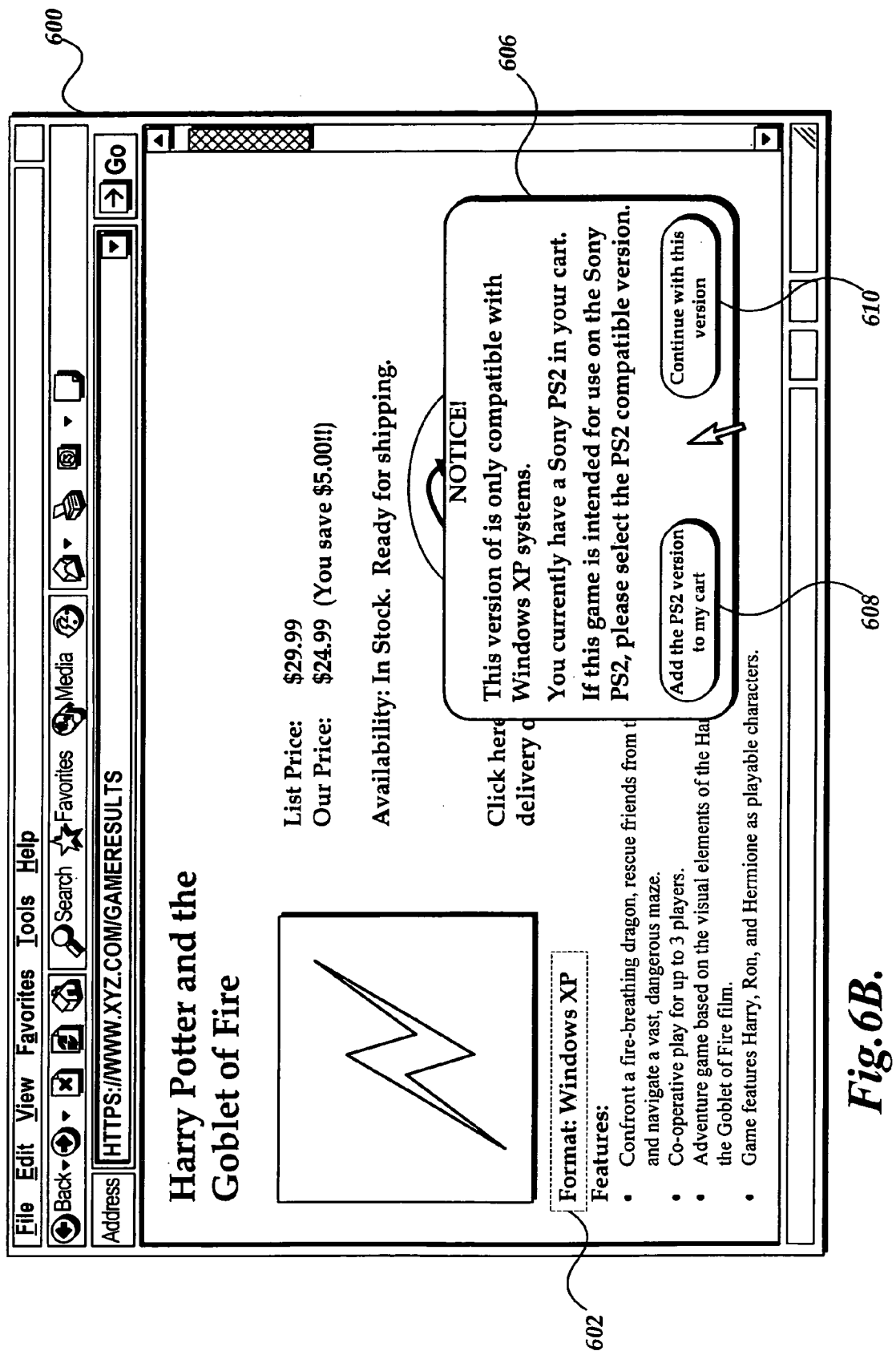

As indicated above, there are a variety of aspects of any particular item with which the exemplary evaluation server 116 may detect some inconsistencies and incompatibilities. As mentioned above, these aspects may include format, type, category, trait, inter-operability, wish lists, registries, consumer preferences, and the like. These aspects may also include or be based upon, but are not limited to, service provider, model number and/or model year. Similarly, there may be other evaluations to detect inconsistencies and incompatibilities in addition to comparing selected items to the consumer's profile information. For example, FIGS. 6A-6B are pictorial diagrams of exemplary screen displays generated on a consumer device when purchasing multiple items in which at least one item is inconsistent or incompatible with another item in an electronic shopping cart. For purposes of the present discussion, it is assumed that the consumer already has selected and placed a game console into the electronic shopping cart.

As shown in FIG. 6A, an exemplary screen display 600 is presented to the consumer regarding a computer game for purchase. As those skilled in the art will appreciate, many games are developed and made available over a broad spectrum of gaming platforms. Thus, when searching for a particular game that is supported on a variety of gaming platforms (including both computers and dedicated game systems), care must be taken to ensure that the correct platform version of the game is selected. This is especially true because, in many cases, returns are not available on opened software and/or games. Unfortunately, in spite of the difficulty for both consumers and vendors in processing returns on opened games (hardware or software), the platform version information may be overlooked or ignored. For example, with reference to FIG. 6A, the game illustrated in the exemplary screen display 600 is in Windows XP format, as indicated by the product information 602. However, while the product information 602 is displayed in the screen display 600, with so much other information also displayed, the format information may be easily overlooked.

Assuming, then, that a game console has already been added to the electronic shopping cart that is incompatible with a Windows XP version of the game, when the user mistakenly adds the Windows XP version of the game to the electronic shopping cart by selecting the add to cart icon 604, a potential inconsistency/incompatibility is created, as well as an increased likelihood that the game will be returned. However, according to one aspect of the present invention, by comparing the newly added item to other items in the electronic shopping cart, the evaluation server 116 detects the inconsistency and/or incompatibility between the selected game and the game console, and issues a warning to the consumer.

As shown in FIG. 6B, when the consumer attempts to add a game that is incompatible with another item in the electronic shopping cart, a notice window 606 is displayed that advises the consumer of the compatibility issues and requests that the consumer either confirm the addition of the currently selected game to the electronic shopping cart via confirmation button 610 or confirm the substitution of the current game with an alternative version of the game compatible with the selected game console via confirmation button 608. With regard to evaluating an item against other items selected by a consumer for purchase, generally described above in regard to FIGS. 6A and 6B, FIGS. 7A-7B are flow diagrams of an exemplary routine 700 for detecting known or perceived inconsistencies or incompatibilities with a selected item and at least one other item in an electronic shopping cart. Beginning at block 702, the selected item is compared to other items already in the electronic shopping cart to determine whether an inconsistency or incompatibility exists. At decision block 704, a determination is made as to whether the selected item is related in some aspect to one or more items in the electronic shopping cart. If the selected item is not related to another item, the routine 700 moves to block 710 where the selected item is added to the electronic shopping cart. Thereafter the routine 700 terminates.

If the selected item is related to another item such that an inconsistency or incompatibility may exist, the routine 700 proceeds to decision block 706. At decision block 706, a determination is made as to whether the selected item is consistent and/or compatible with the other items already in the electronic shopping cart using information stored in the product information data store 318. This determination may be based on a variety of aspects as described above including, but not limited to, format, traits, categories, product families, wish lists, and the like. For example: a camera lens may only be compatible with a particular camera body; a coffee machine may require a particular filter; a satellite subscription service may require a particular receiver type; and the like. A determination of inconsistency/incompatibility may also be further based on duplicated or expired items. However, incompatibility based on duplicate items depends on the specific item. More particularly, while buying more than one of certain items may not always make sense (such as buying two copies of the same game for the same game console), buying multiple copies of the same item will make sense in other circumstances (such as buying two memory expansion modules for a computer).

There may be items in the electronic shopping cart with which the selected item is consistent/compatible as well as items with which the selected item is not consistent/compatible. In these circumstances, the fact that the selected item is consistent and/or compatible with at least some items may be viewed as sufficient to add the selected item to the shopping cart without any further consumer inquiry. Thus, the level of consistency or compatibility with one or more items should be a matter of implementation. However, for the present discussion, it will be assumed that the selected item is consistent with all or none of the other items in the electronic shopping cart.

If the selected item is consistent with the other items in the electronic shopping cart, the routine 700 proceeds to block 710 where the selected item is placed in the cart and the routine terminates. Alternatively, if the selected item is not consistent with the other items in the shopping cart, the routine proceeds to decision block 708.

Figure 7A:
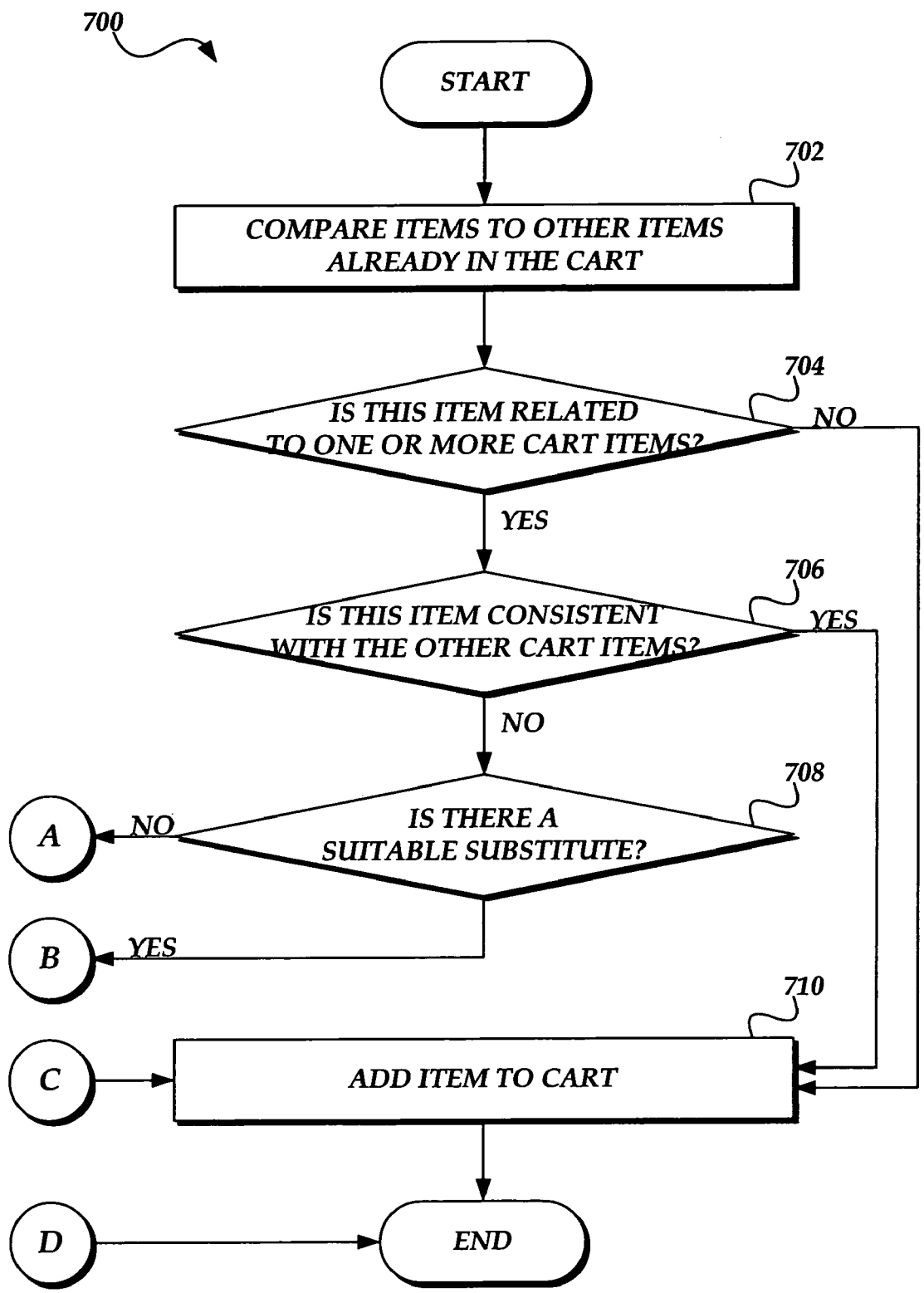
FIGS. 7A-7B are a flow diagram of an exemplary routine for detecting inconsistencies among at least two of a plurality of items in an electronic shopping cart.
Figure 7B:
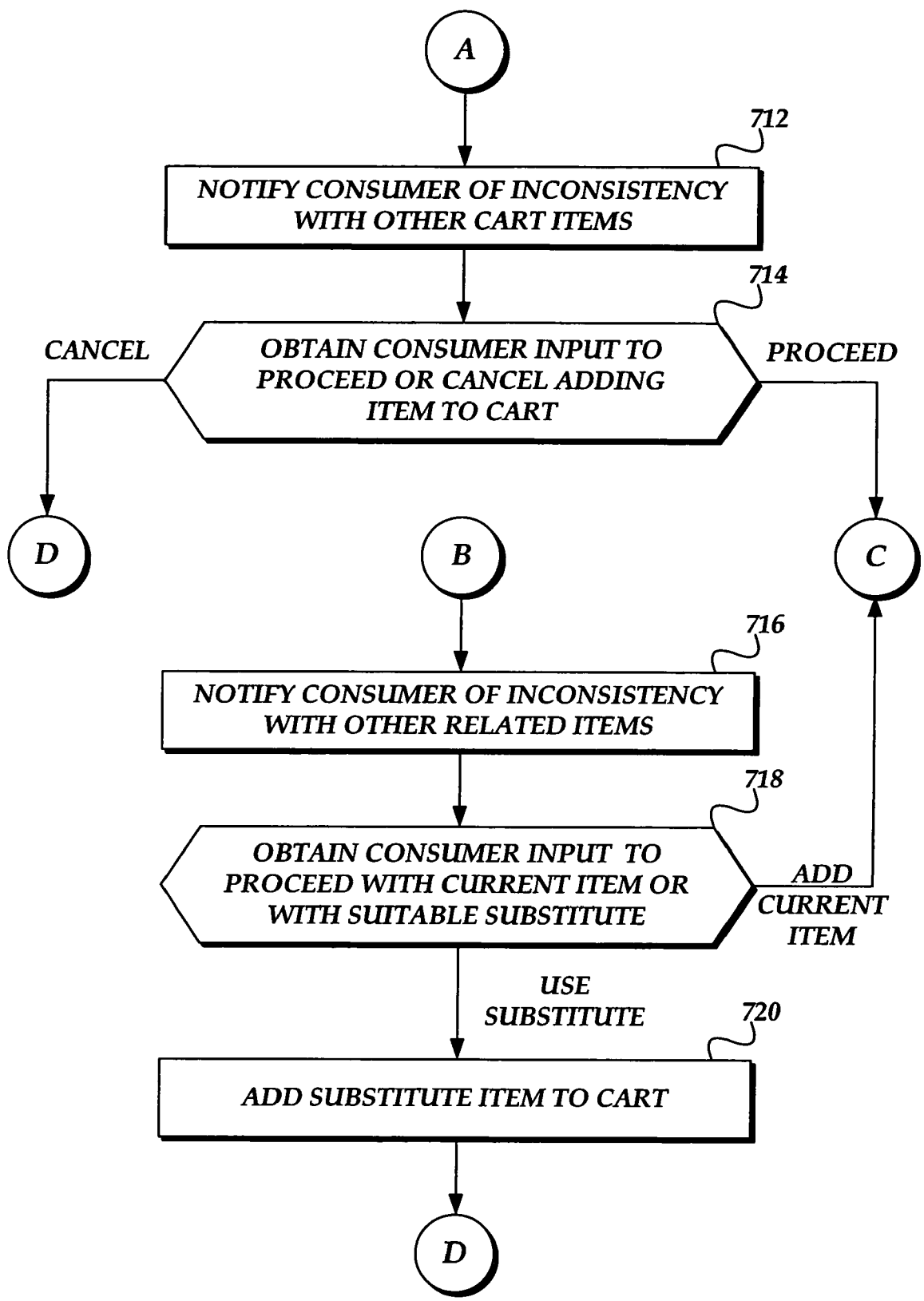

At decision block 708, a determination is made as to whether there is a substitute for the selected item that is consistent with the other items in the electronic shopping cart. If there is not a consistent substitute, the routine 700 proceeds to block 712 (FIG. 7B). Alternatively, if there is a consistent substitute, the routine 700 proceeds to block 716 (FIG. 7B).

At block 712, the consumer is notified of the inconsistency of the selected item with other related items in the electronic shopping cart. At input block 714, the routine 700 obtains the consumer's input as to whether to add the apparently inconsistent item to the shopping cart or not. If the consumer indicates a desire to proceed with adding the item to the electronic shopping cart, the exemplary routine 700 moves to block 710 (FIG. 7A), where the item is added and the routine terminates. Alternatively, if at input block 714, the consumer cancels adding the item to the electronic shopping cart, the routine 700 terminates without adding the item (as there is no substitute item).

At block 716 (reached because there is a consistent substitute item for the selected item), the consumer is notified of the inconsistency of the selected item with the other cart items, and further notified regarding the substitute for the selected item. At input block 718, the routine 700 obtains the consumer's input regarding whether to add the selected (and apparently inconsistent) item to the shopping cart, or add the substitute to the shopping cart. An example of this type of notice is shown as notice window 606 in FIG. 6B.

If the consumer indicates a desire to proceed with adding the current item to the electronic shopping cart, the exemplary routine 700 moves to block 710 (FIG. 7A), where the item is added to the electronic shopping cart and the routine terminates. Alternatively, if the consumer indicates a desire to substitute the current item with the consistent item, at block 720 the substitute item is added to the electronic shopping cart. Thereafter, the routine 700 terminates.

In addition to comparing a current item against a consumer's own purchase history, supplied preferences, other consumer profile information, or current electronic shopping cart items, combinations of selected items may also be compared against the combinations of purchases by other consumers, which combinations resulted in a return. Moreover, combinations of selected items may also be compared against the combinations of purchases by other consumers to see whether or not the current combination of selected items has been purchased at all, the belief being that unique combinations typically result in higher rates of returns and therefore represent an inconsistency and/or incompatibility. Thus, if the current combination of selected items is identified as a combination that resulted in a return or, if no other consumer has purchased the particular combination of selected items, the consumer may be advised/queried.

Figure 8A:
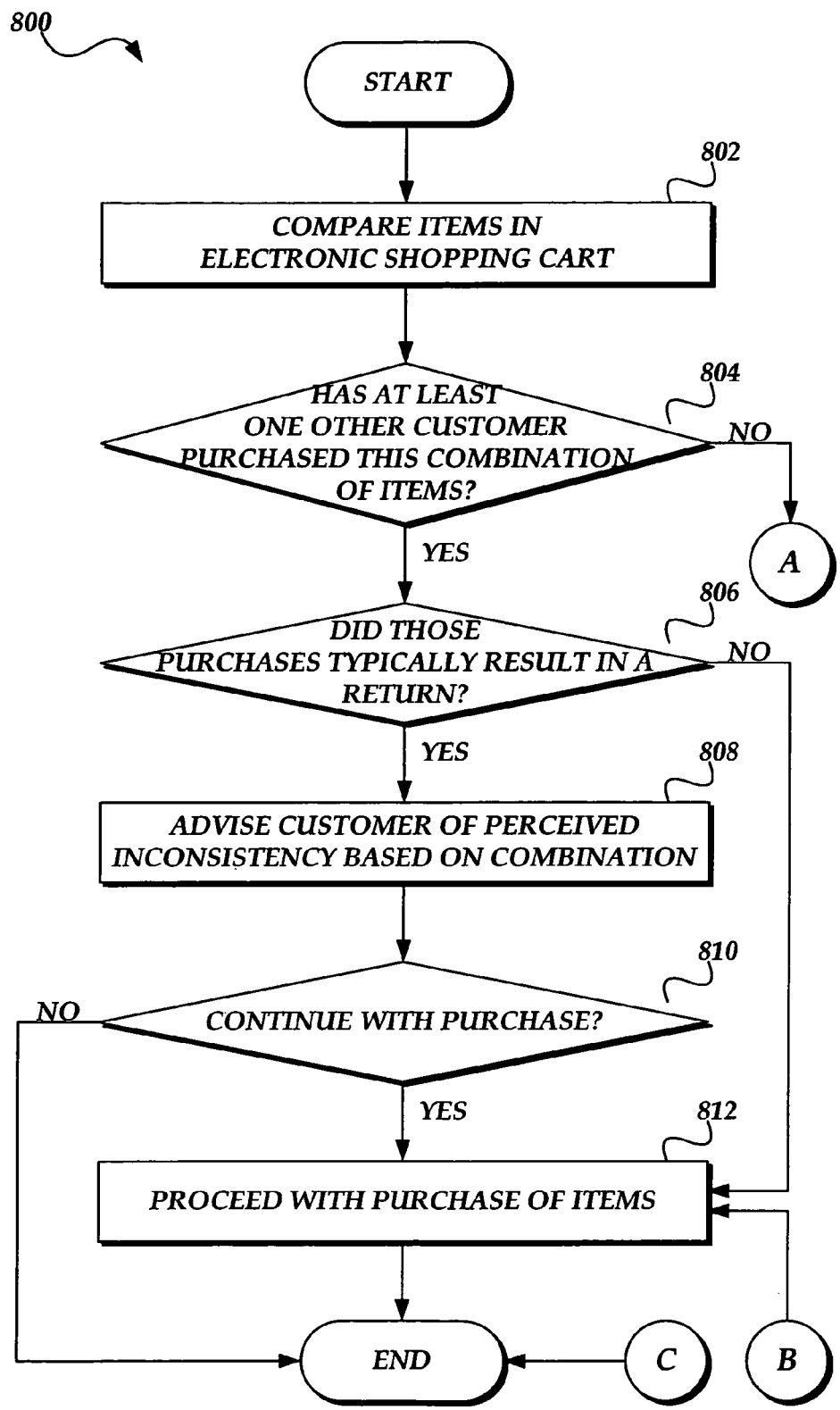
FIGS. 8A-8B are a flow diagram of an exemplary routine for detecting inconsistencies based on a current combination of selected items.
Figure 8B:
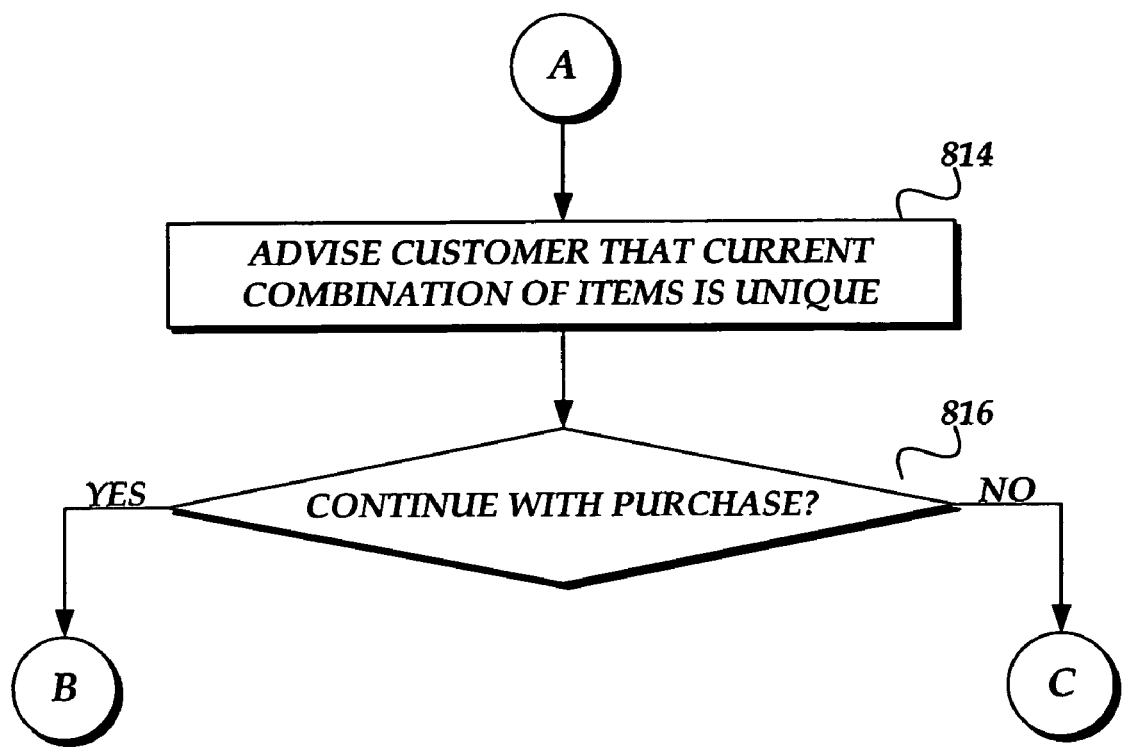

FIGS. 8A-8B are a flow diagram of an exemplary routine 800 for detecting known or potential inconsistencies and/or incompatibilities based on the lack of a previous purchase of the combination by anyone, or based on one or more returns typically resulting from the combination of selected items.

Beginning at block 802, the set of selected purchase items in the electronic shopping cart is compared to information regarding other purchases by the evaluation server 116. At decision block 804, a determination is made as to whether at least one other consumer, or some threshold number or percentage of consumers, has purchased the particular combination of items found in the electronic shopping cart. For example, the evaluation server 116 may determine that the selected combination of items represents a known or perceived inconsistency or incompatibility unless a threshold of one hundred other consumers purchased that same combination of items.

If no other consumers (or an insufficient number or percentage of consumers) have previously purchased the particular combination of items, the selected combination of items is suspected as an inconsistency, i.e., a perceived inconsistency, and the routine 800 proceeds to block 814 (FIG. 8B), as described below. Alternatively, the routine 800 proceeds to decision block 806, where a determination is made as to whether the prior purchase of the current combination of selected items corresponds to other previous purchases of the same combination (by anyone or a threshold number or percentage of consumer purchases) that resulted in a return of at least one of the items. Such information may be stored in the purchase return data store 312.

In some embodiments, rather than simply checking for whether any returns occurred in regard to prior purchases of the combination of items, the routine 800 may check to see whether a threshold number or percentage of prior purchases of this particular combination resulted in a return, and only notify the consumer if that threshold number or percentage is met. Similarly (not shown), the routine 800 may also evaluate whether any returns occurred because of a product defect, indicating that the combination was not the cause of the return.

At decision block 806, if the prior purchases of the current combination of items did not result in a return, the routine 800 proceeds to block 812 where the current combination of items is purchased and the routine terminates. However, if the prior purchases of the current combination of items typically resulted in the return of at least one item, the combination is interpreted as having a perceived inconsistency and the routine 800 proceeds to block 808.

At block 808, the consumer is notified of the perceived inconsistencies based on other purchases of the same or similar combination of items and is requested to indicate whether or not to continue with the purchase, e.g., via a screen display such as those described above. At decision block 810, a determination is made as to whether to continue with the purchase based on consumer input. If the purchase is to continue, at block 812 the items are purchased and the routine 800 terminates. Alternatively, if at decision block 810 the consumer cancels the current purchase, the routine 800 immediately terminates.

At block 814 (FIG. 8B), reached because the current combination of items is unique (or nearly unique), the consumer is advised of the combination's uniqueness and is asked whether the consumer wishes to proceed with the current purchase. At decision block 816, based on the consumer's input, a determination is made as to whether to continue with the purchase or not. If the consumer indicates a desire to cancel the purchase, the routine 800 immediately terminates. Alternatively, if the client wishes to proceed with the purchase, at block 812 the purchase transaction proceeds. Thereafter the routine 800 terminates.

While the above described routine 800, as well as the other routines 500 and 700, indicate that, upon the finding of a conflict, the consumer is presented with an advisory window (e.g., notice window 606 of FIG. 6B), it is illustrative only and should not be construed as limiting upon the present invention. For example, in alternative embodiments, an audible warning, a flashing icon, and the like, may be used as suitable warnings. Further, in some embodiments, notification may be made only when a suitable substitute item is available. Still further, the notification may be configurable such that the consumer may turn off any notification of inconsistencies, following the tenet that the "consumer is always right."

As those skilled in the art will appreciate, matching only combinations that precisely or exactly correspond to combinations of prior purchases (i.e., "direct" comparisons) limits the number of corresponding combinations upon which a consistency determination may be made. Moreover, those skilled in the art will also appreciate that for-sale items are frequently updated, improved, re-branded, repackaged, or otherwise relabeled such that they might appear as a "new" item even though they are actually the same item. Additionally, even when a product is updated, quite frequently any updates to a product are irrelevant with regard to the comparison between a combination of selected items and combinations of prior purchases. Thus, when evaluating a current combination of items with prior purchases, it is sometimes beneficial to evaluate both the current combination and "indirect" combinations of the current items against combinations of prior purchases to determine consistency/compatibility, where the "indirect" combinations are generated based on one or more levels of indirection of related products to the current combination.

Figure 9:
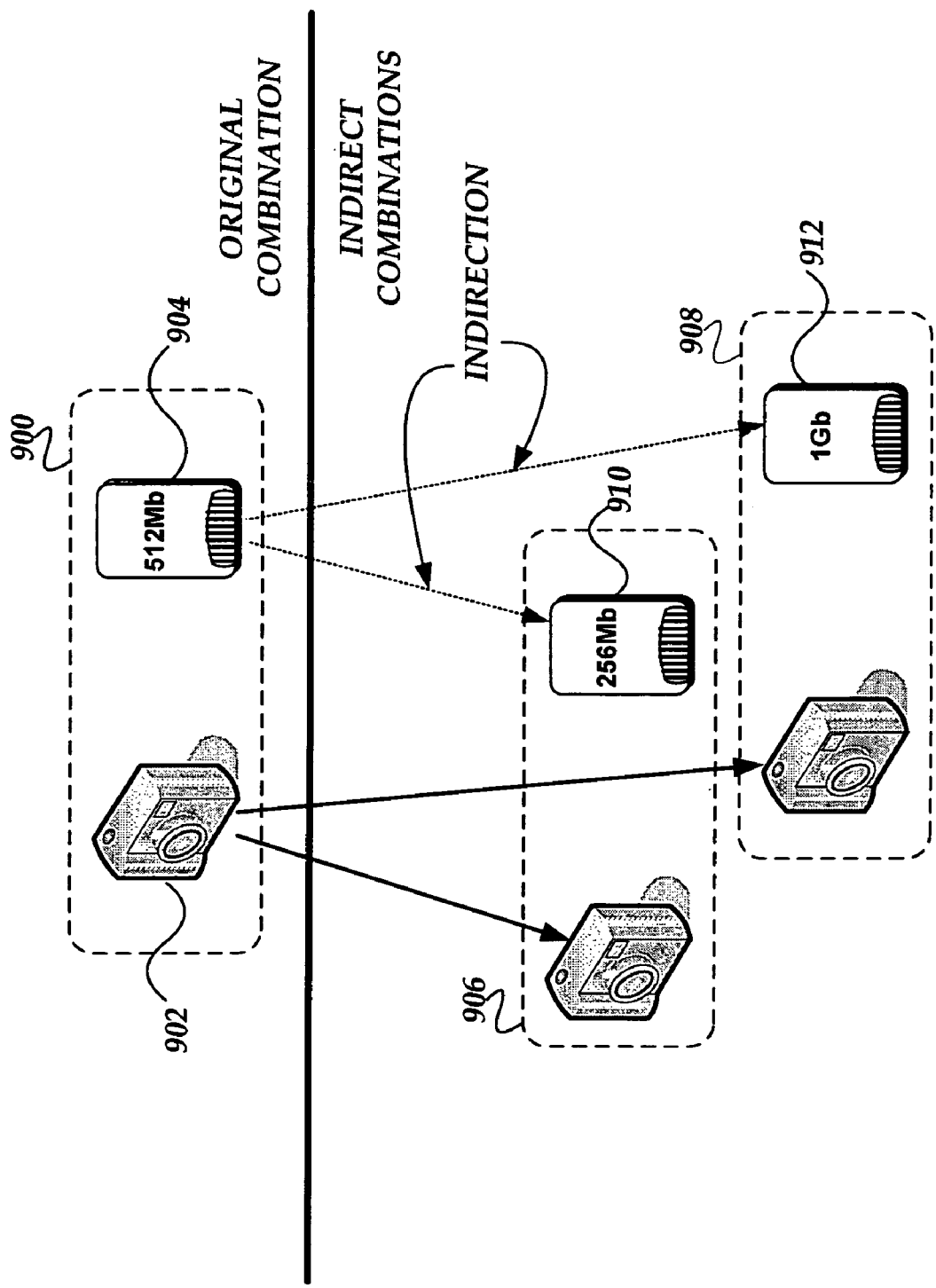
FIG. 9 is a pictorial diagram illustrating direct combinations and indirect combinations of selected products.

To more fully illustrate indirection of products to generate indirect combinations for comparison, FIG. 9 is a pictorial diagram illustrating a direct combination and indirect combinations of selected products. In particular, FIG. 9 illustrates an exemplary direct combination 900 of a digital camera 902 and a compatible flash memory card 904. When a consumer indicates a desire to purchase this combination, as discussed above in regard to decision block 804 (FIG. 8A), the direct combination 900 is compared against combinations of prior purchases. However, those skilled in the art will appreciate that there are numerous suppliers of flash memory, as well as numerous storage capacities associated with a particular flash memory format (e.g., SD, xD, compact flash, memory stick, and the like), such that an exact comparison of the direct combination 900 to other previously purchased combinations, especially with regard to the flash memory card 904, may not yield satisfactory results. Accordingly, a prior purchase of the specific combination 900 may not be precisely found, but if a level of indirection were applied to the flash memory, such as varying the vendor or the storage capacity of the flash memory card 904, a suitably similar and relevant combination may be found.

As shown in FIG. 9, combinations of items at a first level of indirection (i.e., modifying an aspect of one or more direct combination 900 items) are shown. In particular, the indirect combination 906 includes the digital camera 902 and a similar, but not exactly the same, flash memory card 910 (where flash memory card 910 has less storage capacity than flash memory card 904). Similarly, indirect combination 908 includes the digital camera 902 and a similar flash memory card 912 (where flash memory card 912 has larger storage capacity). Thus, by varying the storage capacity of the flash memory card 904, the number of combinations that are compared against prior purchases is increased, as well as the increased confidence in a finding of consistency/inconsistency corresponding to previously purchased combinations of products.

Quite frequently, for any given combination of items, numerous indirections may be made. Numerous aspects of an item, such as, but not limited to, manufacturer, storage capacities (as described above in regard to FIG. 9), model numbers, formats, traits, and the like, may all, at some time, be varied to derive a related indirect combination of items to compare (as described in decision block 804 of FIG. 8A) against previously purchased combinations. For example, there are several manufactures of xD flash memory cards, each of which produces xD memory that conforms to the xD specifications and each of which may be used in an indirect combination. Additionally, with regard to format, CD-R and CD-RW disks may be viewed as consistent and compatible with regard to a CD-RW drive, and may thus represent an indirection. In sum, by varying at least some aspects of one or more items to create indirect combinations, the frequency of detecting an inconsistency is substantially enhanced. However, it should also be appreciated that the more levels of indirection that are applied to the original combination, the greater likelihood that the indirect combinations are not relevant or are inconsistent with the original combination. Thus, restraint should be applied in the amount of indirection applied to a particular combination. In one embodiment, to ensure that indirect combinations are relevant or applicable, the generated indirect combinations may be evaluated against the original current combination for consistency.

Figure 10:
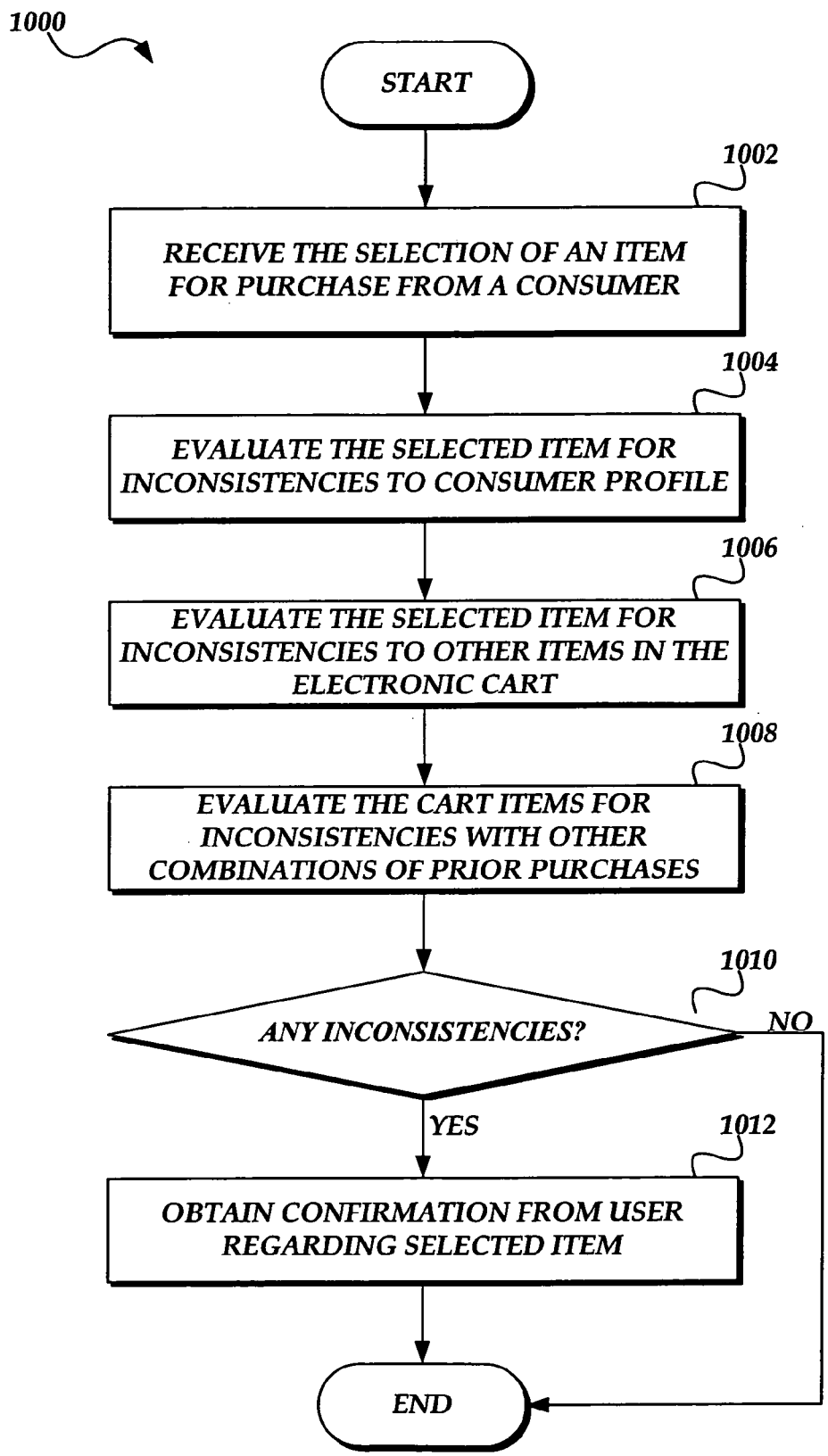
FIG. 10 is a flow diagram of an exemplary routine for detecting inconsistencies based on consumer profile information, other items presently selected for purchase, and combinations of selected items.

In addition to the above exemplary routines being separately implemented, they also may be used in conjunction with one another to further limit any possible inconsistencies that may arise. To that end, FIG. 10 is a flow diagram illustrating an exemplary routine 1000 combining various techniques for detecting inconsistencies with selections of items for purchase. Beginning at block 1002, the exemplary routine receives the selection of an item for purchase by the consumer. This selected item, if purchased, would be purchased with any other items within the consumer's current electronic shopping cart.

At block 1004, the selected item is evaluated for inconsistencies and/or incompatibilities with consumer profile information and/or the consumer's prior purchases. Evaluating the selected item for inconsistencies and/or incompatibilities with consumer profile information and/or the consumer's prior purchases is described above in regard to FIGS. 5A and 5B.

At block 1006, the selected item is evaluated for inconsistencies and incompatibilities with regard to other items in the consumer's electronic shopping cart. Evaluating the selected item for inconsistencies and/or incompatibilities with regard to other items in the consumer's electronic shopping cart was previously described above in regard to FIGS. 7A and 7B.

At block 1008, the now current combination of items in the electronic shopping cart, including the selected item, is evaluated against other combinations of prior purchases. Similarly, indirect combinations of the current combination may also be evaluated against the combinations of prior purchases. Evaluating the current combination of items in the electronic shopping cart (and indirect combinations) with regard to combinations of prior purchases to detect known or perceived inconsistencies was previously described above in regard to FIGS. 8A and 8B.

At decision block 1010, a determination is made as to whether any inconsistencies and/or incompatibilities were discovered with regard to the addition/purchase of the selected item. If no inconsistencies were discovered, the exemplary routine 1000 for detecting such inconsistencies terminates. Alternatively, if there were one or more inconsistencies detected, at block 1012 the consumer is advised of the inconsistencies and the consumer's confirmation is obtained to continue with the purchase of the selected item and/or shopping cart items. While not shown, an advisory to the consumer may include a suitable alternative for the selected or inconsistent item, and/or may also provide for the consumer to cancel the purchase of the selected item or items.

While reducing the frequency of returns is one of the benefits of detecting inconsistencies and/or incompatibilities with regard to a selected item or selected items, returns are actually part of a larger context, that of consumer dissatisfaction. Clearly, if a consumer returns an item, it is often because the consumer is dissatisfied with the returned item. However, if a consumer if dissatisfied with an item, in addition to or instead of returning the item, the consumer may submit a complaint to the vendor regarding the item and/or provide negative feedback (e.g., with poor ratings) with regard to the item or vendor. Thus, detecting inconsistencies with regard to a selected item or items enables a network shopping service to reduce the likelihood of dissatisfaction that a user will experience with that item.

According to embodiments of the invention, at a network shopping server 110, instances of returned items, negative feedback, complaints, as well as the number or frequency of the same, may all be compiled to create a dissatisfaction score for an item or set of items. Moreover, the dissatisfaction score may be further based on the percentage of complaints/returns/negative feedback per instance of purchase of an item or items. Of course, the dissatisfaction score may then be used by the evaluation component 310 to determine whether a selected item or selected items represents an increased likelihood of dissatisfaction by the user. For example, if the evaluation component 310 determines that a dissatisfaction score for an item or set of items exceeds a certain, predetermined threshold, an inconsistency warning could be issued to the consumer.

Various flow diagrams detailing particular exemplary routines of detecting inconsistencies among selected items and with regard to consumer profiles have been described above, each of which is separately suitable for implementation as a method for conducting a shopping and purchase transaction with a consumer. Moreover, each routine may be suitably embodied as computer-executable instructions stored on a computer-readable medium, such as a CD-ROM or DVD disk, a floppy disk, magnetic tape, flash memory storage devices, and the like.

While many of the above-described embodiments have been illustrated in regard to a networked shopping service, the invention is also suitably utilized in typical "bricks and mortar" stores. For example, if purchasing clothing for a department store having a consumer profile data store, as a shirt is scanned for purchase, the department store's system may recognize that the shirt is the "wrong" size for the consumer and suggest that the clerk confirm the purchase with the consumer. Of course, the consumer may be purchasing the shirt as a gift for someone else and can easily confirm his or her intent to purchase the shirt. However, if it is for the consumer, this provides an opportunity for the clerk to exchange it for the "right" size. Similarly, an office products store may recognize that the lead refills are the wrong size for the mechanical pencil the consumer is purchasing. Clearly, the consumer may have other mechanical pencils for which he or she is purchasing the lead refills, but if not, the wrong sized lead is incompatible with the mechanical pencil and its purchase will lead to consumer frustration.

Various embodiments described above are made in regard to a purchase transaction. However, the present invention may be suitably applied in a variety of non-purchase contexts. For example, the present invention may be beneficially utilized in regard to a library system with regard to patron preferences of genres, previously read books, video/DVD format issues, and the like. Moreover, the present invention may be suitably and beneficially applied to product/supply requisitions within a corporation. Accordingly, the present invention should not be construed as limited to a purchase transaction context.

While various exemplary embodiments have been illustrated and described, it will be appreciated that various changes can be made therein without departing from the spirit and scope of the invention.

What is claimed is:

1. A computer system for evaluating items that are selected by a user for a transaction, the computer system comprising:
one or more databases that store user profile information related to the user and information related to the items that are selected by the user for the transaction, wherein the user profile information related to the user is stored in the one or more databases prior to user selection of any of the items for the transaction; and a computing device in communication with the one or more databases, the computing device comprising a processor and a memory, wherein the computing device is configured to:

determine whether an item selected by the user for the transaction is inconsistent by comparing information related to the selected item to user profile information stored in the one or more databases and by comparing the items that are selected by the user, including the selected item, against combinations of items previously selected by other users; and advise the user of an inconsistency if the selected item is inconsistent with the user profile information stored in the one or more databases or if the items that are selected by the user, including the selected item, matches a threshold number of combinations of items previously selected by other users that resulted in a return.

2. The computer system of claim 1, wherein the user profile information comprises a history of items previously purchased by the user.

3. The computer system of claim 1, wherein the user profile information comprises a history of items previously selected by the user.

4. The computer system of claim 3, wherein the computing device is configured to determine whether the selected item is inconsistent by comparing an aspect of the selected item to an aspect of items previously selected by the user.

5. The computer system of claim 4, wherein the aspect of the selected item and of the items previously selected by the user includes at least one of inter-operability, type, category, and trait.

6. The computer system of claim 4, wherein the selected item is a movie and the aspect of the selected item and of the items previously selected by the user includes a display format of the movie.

7. The computer system of claim 1, wherein the user profile information comprises preferences of the user.

8. The computer system of claim 1, wherein the user profile information comprises a list of desired items not currently owned by the user.

9. The computer system of claim 1, wherein the user profile information comprises digital locker information for the user.

10. The computer system of claim 1, wherein the user profile information comprises digital rights management information associated with the user.

11. The computer system of claim 1, wherein the computing device is further configured to:

determine context-based information regarding the user; and determine whether the selected item is inconsistent with the context-based information.

12. The computer system of claim 1, wherein the information related to the items that are selected by the user for the transaction comprises a set of one or more other items presently selected by the user, and wherein the computing device is further configured to determine whether the selected item is inconsistent with any items in the set of one or more other items presently selected by the user.

13. The computer system of claim 12, wherein the set of one or more other items presently selected by the user comprises a set of items selected by the user for purchase.

14. The computer system of claim 12, wherein the computing device is configured to determine whether the selected item is inconsistent with any items in the set of one or more other items presently selected by the user by comparing an aspect of the selected item to an aspect of the other items in the set of one or more other items presently selected by the user.

15. The computer system of claim 14, wherein the selected item is inconsistent with the other items in the set of one or more other items presently selected by the user if the selected item is inconsistent with at least a threshold number of items in the set of one or more other items.

16. The computer system of claim 14, wherein the selected item is inconsistent with the other items in the set of one or more other items presently selected by the user if the selected item is inconsistent with at least one other item in the set of one or more other items.

17. The computer system of claim 1, wherein the information related to the items that are selected by the user for the transaction comprises information regarding combinations of items selected by other users, and wherein the computing device is further configured to determine whether a combination of items presently selected by the user is inconsistent with the combinations of items selected by other users.

18. The computer system of claim 17, wherein the computing device is further configured to determine whether an indirect combination of items presently selected by the user is inconsistent with the combinations of items selected by other users.

19. The computer system of claim 1, wherein the computing device is further configured to determine whether a combination of items presently selected by the user is inconsistent with a threshold number of combinations of items selected by other users.

20. The computer system of claim 19, wherein the computing device is further configured to determine whether an indirect combination of items presently selected by the user is inconsistent with the threshold number of combinations of items selected by other users.

21. The computer system of claim 1, wherein, if the selected item is determined to be inconsistent, the computing system is further configured to:

determine whether there is a suitable, consistent alternative item for the selected item; and if there is a suitable, consistent alternative item, present the alternative item to the user as a substitute for the selected item.

22. The computer system of claim 1, wherein, if the selected item is determined to be inconsistent, the computing system is further configured to:

determine whether there is a suitable, consistent alternative item for the selected item; and if there is a suitable, consistent alternative item, automatically substitute the selected item with the alternative item.

23. The computer system of claim 1, wherein the information related to the items that are selected by the user for the transaction comprises information regarding combinations of items selected by other users.

24. The computer system of claim 1, wherein the transaction is a purchase transaction.

25. A non-transitory computer-accessible medium having computer-executable components encoded thereon which, when executed on a computer, configure the computer to detect conditions resulting in an increased likelihood of user dissatisfaction, the components comprising:

an evaluation component configured to determine whether a selected item represents an increased likelihood of user dissatisfaction by comparing a current combination of items presently selected by a user, including the selected item, to other combinations of items selected by other users, wherein the evaluation component is further configured to determine that the selected item represents an increased likelihood of user dissatisfaction if an aspect of the selected item is inconsistent with user profile information; and a notification component configured to notify the user if the evaluation component determines that the selected item represents an increased likelihood of user dissatisfaction, and to obtain specific user input that the user wishes to proceed with the selected item despite the increased likelihood of user dissatisfaction.

26. The computer-accessible medium of claim 25, wherein the notification component is further configured to obtain a user confirmation regarding the selected item if the selected item represents an increased likelihood of user dissatisfaction.

27. The computer-accessible medium of claim 25, wherein the user profile information comprises user-supplied preferences.

28. The computer-accessible medium of claim 25, wherein the user profile information comprises a list of desired items not currently owned by the user.

29. The computer-accessible medium of claim 25, wherein the user profile information comprises digital rights management information associated with the user.

30. The computer-accessible medium of claim 25, wherein the user profile information is determined from a context with the user.

31. The computer-accessible medium of claim 30, wherein the context is a communication context.

32. The computer-accessible medium of claim 25, wherein the user profile information comprises information identifying prior selections of the user.

33. The computer-accessible medium of claim 25, wherein the evaluation component is further configured to determine that the selected item represents an increased likelihood of user dissatisfaction if an aspect of the selected item is inconsistent with an aspect of other items presently selected by the user.

34. The computer-accessible medium of claim 25, wherein the evaluation component is further configured to determine that the selected item represents an increased likelihood of user dissatisfaction if an aspect of the selected item is inconsistent with an aspect of other items previously purchased by the user.

35. The computer-accessible medium of claim 25, wherein the evaluation component is configured to determine that the selected item represents an increased likelihood of user dissatisfaction if the current combination of items presently selected by the user does not correspond to any combinations of items selected by other users.

36. The computer-accessible medium of claim 25, wherein the evaluation component is configured to determine that the selected item represents an increased likelihood of user dissatisfaction if the current combination of items presently selected by the user does not correspond to a threshold number of combinations of items selected by other users.

37. The computer-accessible medium of claim 25, wherein the evaluation component is further configured to:

generate an indirect combination of items based on the current combination of items presently selected by the user; and wherein the evaluation component is configured to determine that the selected item represents an increased likelihood of user dissatisfaction if the current combination of items presently selected by the user and the indirect combination of items do not correspond to any combinations of items selected by other users.

38. The computer-accessible medium of claim 25, wherein the evaluation component is further configured to:

generate an indirect combination of items based on the current combination of items presently selected by the user; and wherein the evaluation component is configured to determine that the selected item represents an increased likelihood of user dissatisfaction if the current combination of items presently selected by the user and the indirect combination of items do not correspond to a threshold number of combinations of items selected by other users.

39. The computer-accessible medium of claim 25, wherein the evaluation component is configured to determine that the selected item represents an increased likelihood of user dissatisfaction according to a dissatisfaction score corresponding to the current combination of items presently selected by the user.

40. The computer-accessible medium of claim 39, wherein the dissatisfaction score corresponding to the current combination of items presently selected by the user is determined based on returns of at least one item from corresponding combinations selected by the other users.

41. The computer-accessible medium of claim 39, wherein the dissatisfaction score corresponding to the current combination of items presently selected by the user is determined based on user complaints regarding at least one item from corresponding combinations selected by the other users.

42. The computer-accessible medium of claim 39, wherein the dissatisfaction score corresponding to the current combination of items presently selected by the user is determined based on negative feedback of at least one item from corresponding combinations selected by the other users.

43. The computer-accessible medium of claim 39, wherein the dissatisfaction score corresponding to the current combination of items presently selected by the user is determined based on at least one of a volume of returns, a volume of complaints, and a volume of negative feedback of at least one item from corresponding combinations selected by the other users.

44. The computer-accessible medium of claim 39, wherein the dissatisfaction score corresponding to the current combination of items presently selected by the user is determined based on at least one of a percentage of returns, a percentage of complaints, and a percentage of negative feedback of at least one item from corresponding combinations selected by the other users.

45. The computer-accessible medium of claim 39, wherein the evaluation component is configured to determine that the selected item represents an increased likelihood of user dissatisfaction if the dissatisfaction score corresponding to the current combination of items presently selected by the user exceeds a predetermined threshold.

46. The computer-accessible medium of claim 25, wherein the evaluation component is further configured to:

generate an indirect combination of items based on the current combination of items presently selected by the user; and determine that the selected item represents an increased likelihood of user dissatisfaction according to dissatisfaction scores corresponding to the current combination of items and the indirect combination of items.

47. The computer-accessible medium of claim 46, wherein the dissatisfaction scores corresponding to the current combination of items and the indirect combination of items are determined based on information regarding returns of at least one item from other combinations of items selected by other users that correspond to the current combination of items and the indirect combination of items.

48. The computer-accessible medium of claim 46, wherein the dissatisfaction scores corresponding to the current combination of items and the indirect combination of items are determined based on user complaints of at least one item from other combinations of items selected by other users that correspond to the current combination of items and the indirect combination of items.

49. The computer-accessible medium of claim 46, wherein the dissatisfaction scores corresponding to the current combination of items and the indirect combination of items are determined based on negative feedback of at least one item from other combinations of items selected by other users that correspond to the current combination of items and the indirect combination of items.

50. The computer-accessible medium of claim 46, wherein the dissatisfaction scores corresponding to the current combination of items and the indirect combination of items are determined based on at least one of a volume of returns, a volume of complaints, and a volume of negative feedback of at least one item from other combinations of items selected by other users that correspond to the current combination of items and the indirect combination of items.

51. The computer-accessible medium of claim 46, wherein the dissatisfaction scores corresponding to the current combination of items and the indirect combination of items are determined based on at least one of a percentage of returns, a percentage of complaints, and a percentage of negative feedback of at least one item from other combinations of items selected by other users.

52. The computer-accessible medium of claim 46, wherein the evaluation component is configured to determine that the selected item represents an increased likelihood of user dissatisfaction if the dissatisfaction scores corresponding to the current combination of items and the indirect combination of items exceeds a predetermined threshold.

53. A computer-implemented method for evaluating items selected by a user, the method comprising:
under control of instructions that are executed by one or more computing devices:
receiving a selection of an item from the user;
evaluating the selected item to determine whether the selection of the item represents an inconsistency to the user, wherein a current combination of items presently selected by the user, including the selected item, is compared to other combinations of items selected by other users, and wherein said evaluating further comprises comparing an aspect of the selected item to an aspect of other items previously purchased by the user;
advising the user if the selection of the item represents an inconsistency; and
confirming an intent of the user to select the item if the selection of the item represents an inconsistency to the user, wherein confirming the intent of the user includes receiving specific input from the user that the user wishes to proceed with the selected item despite the inconsistency.

54. The computer-implemented method of claim 53 further comprising, if the selection of the item represents an inconsistency to the user:
determining a substitute item for the selected item that does not represent an inconsistency to the user; and
offering the substitute item to the user.

55. The computer-implemented method of claim 54 further comprising confirming the intent of the user to proceed with the selected item or to accept the substitute item.

56. The computer-implemented method of claim 53 further comprising, if the selection of the item represents an inconsistency to the user:
determining a substitute item for the selected item that does not represent an inconsistency to the user; and
automatically substituting the selected item with the substitute item.

57. The computer-implemented method of claim 53, wherein evaluating the selected item to determine whether the selection of the item represents an inconsistency to the user further comprises comparing an aspect of the selected item to context information relating to the selection of the item.

58. The computer-implemented method of claim 53, wherein evaluating the selected item to determine whether the selection of the item represents an inconsistency to the user further comprises comparing an aspect of the selected item to an aspect of items the user has previously selected.

59. The computer-implemented method of claim 58, wherein comparing the aspect of the selected item to the aspect of items the user has previously selected comprises comparing the formatting of the selected item to the formatting of items the user has previously selected.

60. The computer-implemented method of claim 53, wherein evaluating the selected item to determine whether the selection of the item represents an inconsistency to the user further comprises comparing an aspect of the selected item against user preferences.

61. The computer-implemented method of claim 53, wherein evaluating the selected item to determine whether the selection of the item represents an inconsistency to the user further comprises comparing an aspect of the selected item to an aspect of other items presently selected by the user to determine whether the selected item is inconsistent with the other items.

62. The computer-implemented method of claim 53 further comprising determining that the current combination of items presently selected by the user represents an inconsistency to the user if the current combination of items presently selected by the user does not correspond to any combinations of items selected by other users.

63. The computer-implemented method of claim 53 further comprising determining that the current combination of items selected by the user represents an inconsistency to the user if the current combination of items presently selected by the user does not correspond to a threshold number of combinations of items selected by other users.

64. The computer-implemented method of claim 53 further comprising determining that the current combination of items presently selected by the user represents an inconsistency to the user if the current combination of items presently selected by the user corresponds to a combination of items selected by another user.

65. The computer-implemented method of claim 53 further comprising determining that the current combination of items presently selected by the user represents an inconsistency to the user if information identifying the combination of items selected by another user includes information regarding the return of one of the items of the combination of items selected by another user.

66. The computer-implemented method of claim 53 further comprising determining that the current combination of items presently selected by the user represents an inconsistency to the user if the current combination of items presently selected by the user corresponds to a threshold number of combinations of items selected by other users, wherein the current combination of items is associated with information identifying the current combination of items as representing an inconsistency.

67. The computer-implemented method of claim 53 further comprising generating an indirect combination of items based on the current combination of items presently selected by the user.

68. The computer-implemented method of claim 67 further comprising determining that the current combination of items represents an inconsistency to the user if the current combination of items and the indirect combination of items do not correspond to any combinations of items selected by other users.

69. The computer-implemented method of claim 67 further comprising determining that the current combination of items represents an inconsistency to the user if the current combination of items and the indirect combination of items do not correspond to a threshold number of combinations of items selected by other users.

70. The computer-implemented method of claim 67 further comprising determining that the current combination of items represents an inconsistency to the user if the current combination of items and the indirect combination of items correspond to a combination of items selected by another user, wherein the combination of items selected by another user of items is associated with information identifying the combination of items selected by another user as representing an inconsistency.

71. The computer-implemented method of claim 67 further comprising determining that the current combination of items represents an inconsistency to the user if the current combination of items and the indirect combination of items correspond to a threshold number of combinations of items selected by other users, wherein the current combination of items is associated with information identifying the current combination of items as representing an inconsistency.

72. A computer-implemented warning system for warning of an inconsistency of an item selected from a plurality of items for a transaction, the warning system comprising:
at least one computer having a memory and a processor, wherein the at least one computer is configured to execute instructions that implement a warning component and an evaluation component,
wherein the warning component is configured to provide a warning to a user regarding an inconsistency with respect to the item selected from the plurality of items for the transaction; and
wherein the evaluation component is configured to:
determine whether the selected item represents an inconsistency by comparing an aspect of the selected item against user profile information stored in a user profile database, wherein the user profile information is stored in the user profile database prior to user selection of any items in the transaction, and by comparing a current combination of items selected by the user, including the selected item, against combinations of items previously selected by other users, wherein an inconsistency is determined if the current combination of items matches a threshold number of combinations of items previously selected by other users that resulted in a return; and
instruct the warning component to provide a warning to the user when it is determined that the selected item represents an inconsistency.

73. The computer-implemented warning system of claim 72, wherein the evaluation component is further configured to:
determine a substitute item if the selected item represents an inconsistency; and
instruct the warning component to present the substitute item to the user as an alternative to the selected item.

74. The computer-implemented warning system of claim 73, wherein the warning component is further configured to obtain a selection from the user of the selected item or the substitute item.

75. The computer-implemented warning system of claim 72, wherein the user profile information comprises a history of items previously purchased by the user.

76. The computer-implemented warning system of claim 72, wherein the aspect of the selected item that is compared against the user profile information includes at least one of inter-operability, type, category, and trait.

77. The computer-implemented warning system of claim 72, wherein the user profile information includes user preferences.

78. The computer-implemented warning system of claim 72, wherein the user profile information includes a selection history of the user.

79. The computer-implemented warning system of claim 72, wherein the evaluation component is further configured to determine whether the selected item represents an inconsistency by comparing the selected item against a set of other items presently selected by the user.

80. The computer-implemented warning system of claim 79, wherein the selected item is compared against the set of other items presently selected by the user for duplicates of the selected item.

81. The computer-implemented warning system of claim 79, wherein the selected item is compared against the set of other items presently selected by the user for inter-operability, formatting, or traits.

82. The computer-implemented warning system of claim 72, wherein the evaluation component is further configured to determine whether the selected item represents an inconsistency by comparing a current combination of items selected by the user, including the selected item, against combinations of items selected by other users.

83. The computer-implemented warning system of claim 72, wherein the evaluation component is further configured to determine whether the selected item represents an inconsistency by comparing a current combination of items selected by the user, including the selected item, against combinations of items selected by other users that resulted in a return.

84. The computer-implemented warning system of claim 72, wherein the evaluation component is further configured to determine whether the selected item represents an inconsistency by comparing a current combination of items selected by the user, including the selected item, against combinations of items previously selected by other users, wherein an inconsistency is determined if the current combination of items fails to match a threshold number of combinations of items previously selected by other users.

85. The computer-implemented warning system of claim 72, wherein the evaluation component is further configured to generate at least one indirect combination of items, and wherein the evaluation component is further configured to determine whether the selected item represents an inconsistency by comparing a current combination of items and the at least one indirect combination against combinations of items previously selected by other users.

86. The computer-implemented warning system of claim 72 further comprising a user preferences store, and wherein the evaluation component is further configured to:
if the selected item represents an inconsistency:
evaluate whether the user is to be warned of the inconsistency according to user warning preferences stored in the user preferences store; and
instruct the warning component to provide a warning to the user of the inconsistency according to the user warning preferences.

87. The computer-implemented warning system of claim 86, wherein the user warning preferences include information regarding warning the user if a duplicate item is found among the items presently selected by the user.

88. The computer-implemented warning system of claim 86, wherein the user warning preferences include information regarding warning the user if the selected item is inoperable with other items presently selected by the user.

89. The computer-implemented warning system of claim 86, wherein the user warning preferences include information regarding warning the user if an inconsistency is found with regard to formatting.

90. The computer-implemented warning system of claim 86, wherein the user warning preferences include information regarding warning the user if an incompatibility is found among at least two items presently selected by the user.

91. The computer-implemented warning system of claim 86, wherein the user warning preferences include information regarding warning the user when a known inconsistency is found.

92. The computer-implemented warning system of claim 86, wherein the user warning preferences include information regarding warning the user when a perceived inconsistency is found.

93. The computer-implemented warning system of claim 86, wherein the user warning preferences include information regarding the circumstances under which the warning component is to provide the warning to the user.

94. The computer-implemented warning system of claim 72, wherein the transaction is a purchase transaction.

95. A computer-implemented method for detecting an inconsistency associated with a selected item, the method comprising:
obtaining, by a computing device, a user selection of an item for a transaction;
determining, by a computing device, that the selected item is inconsistent with a set of information, wherein the set of information comprises user configurable preferences that have been stored prior to obtaining user selection of any item in the transaction, and wherein determining that the selected item is inconsistent with the set of information comprises determining that information about the selected item is inconsistent with the user configurable preferences;
determining, by a computing device, that the selected item represents an inconsistency by comparing a current combination of items selected by the user, including the selected item, against combinations of items previously selected by other users, wherein the selected item is determined to represent an inconsistency based on a dissatisfaction score corresponding to the current combination of items selected by the user; and
causing, by a computing device, an inconsistency indication to be displayed if the selected item is determined to be inconsistent.

96. The method of claim 95 further comprising:
determining a substitute item for the selected item, wherein the substitute item is not inconsistent with the set of information; and
causing the substitute item to be displayed with the inconsistency indication.

97. The method of claim 95, wherein the set of information further comprises information related to items previously purchased by the user, and wherein determining that the selected item is inconsistent with the set of information further comprises determining that the selected item is inconsistent with the previously purchased items.

98. The method of claim 95, wherein the user configurable preferences include information regarding whether a particular item may be selected a plurality of times.

99. The method of claim 95, wherein the user configurable preferences include information regarding formatting of selected items.

100. The method of claim 95, wherein the user configurable preferences include information indicating whether the user wishes the inconsistency indication to be displayed.

101. The method of claim 95, wherein the set of information further comprises user profile information, and wherein determining that the selected item is inconsistent with the set of information further comprises determining that the selected item is inconsistent with the user profile information.

102. The method of claim 101, wherein the user profile information is determined in a dynamic manner according to a context in which the user selects the selected item.

103. The method of claim 101, wherein the user profile information includes a prior user selection history, and wherein determining that the selected item is inconsistent with the set of information comprises determining that the selected item is inconsistent with the prior user selection history.

104. The method of claim 103, wherein determining that the selected item is inconsistent with the prior user selection history takes into consideration aging information associated with the prior user selection history.

105. The method of claim 104, wherein the degree to which the prior user selection history is considered in determining that the selected item is inconsistent depends upon the aging information.

106. The method of claim 104, wherein the aging information is considered upon the occurrence of a triggering event.

107. The method of claim 95, wherein the set of information further comprises information regarding a concurrent selection of other items by the user for the transaction, and wherein determining that the selected item is inconsistent with the set of information further comprises determining that the selected item is inconsistent with the information regarding the concurrent selection of other items.

108. The method of claim 95, wherein the set of information further comprises information regarding selection of items by other users, and wherein determining that the selected item is inconsistent with the set of information further comprises determining that the selected item is inconsistent with the information regarding the selection of items by other users.

109. The method of claim 95, wherein the transaction is a purchase transaction.

* * * * *